(12) United States Patent
Lorge

(10) Patent No.: US 10,372,745 B2
(45) Date of Patent: Aug. 6, 2019

(54) COMPUTING THE VALUE OF INFORMATION BETWEEN CONCEPTS

(71) Applicant: International Business Machines Corporation, Armonk, NY (US)

(72) Inventor: Freddy Lorge, Vedrin (BE)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 15/283,806

(22) Filed: Oct. 3, 2016

(65) Prior Publication Data

US 2018/0096062 A1   Apr. 5, 2018

(51) Int. Cl.
*G06F 7/00* (2006.01)
*G06F 17/30* (2006.01)
*G06F 16/36* (2019.01)

(52) U.S. Cl.
CPC ................. *G06F 16/367* (2019.01)

(58) Field of Classification Search
CPC .............. G06F 17/30; G06F 17/30294; G06F 17/30734; G06F 17/2785; G06F 17/279; G06F 17/271; G06F 17/277; G06F 16/367
See application file for complete search history.

(56) References Cited

U.S. PATENT DOCUMENTS

| | | |
|---|---|---|
| 8,589,413 B1 | 11/2013 | Mohan et al. |
| 8,799,330 B2 | 8/2014 | Haim et al. |
| 9,195,647 B1 | 11/2015 | Zhang |
| 2013/0290338 A1* | 10/2013 | Lee .................. G06F 17/30731 707/739 |
| 2014/0032580 A1 | 1/2014 | Majumdar |

(Continued)

FOREIGN PATENT DOCUMENTS

WO   WO 2013127951   9/2013

OTHER PUBLICATIONS

Martinez et al., Computing the Semanitc Distance Between Terms: An Ontology-Based Approach, Retrieved from Internet: URL: http://worldcomp-proceedings.com/proc/p2015/IKE2946.pdf, pp. 132-138, Int'l Conf. Information and Knowledge Engineering | IKE'15 I.

(Continued)

*Primary Examiner* — Azam M Cheema
(74) *Attorney, Agent, or Firm* — Schmeiser, Olsen & Watts, LLP; Robert Shatto

(57) ABSTRACT

A method, and associated computer system and computer program product, for computing a value between two concepts in a schema containing concepts which are linked to each other through associations. In a schema S of n concepts C1, C2 ... Ci ... Cn, the concepts are linked by associations, each association having a semantic distance set in a range between a minimum and a maximum indicating the concepts are completely similar or dissimilar respectively. An information value is determined between concepts from their semantic distance and informational distance. For dissimilar concepts, the informational distance is computed according to a closeness of the concepts. For similar concepts, the informational distance is computed according to a remoteness of the concepts. Both the first and second functions increase with a number of links between C1 and another concept. The number of links is a topological distance between C1 and the other concept.

20 Claims, 23 Drawing Sheets

(56) References Cited

U.S. PATENT DOCUMENTS

| | | | |
|---|---|---|---|
| 2014/0214494 A1* | 7/2014 | Jadhav | G06Q 10/0637 |
| | | | 705/7.36 |
| 2014/0258001 A1* | 9/2014 | Ramaksrihnan | G06Q 30/0276 |
| | | | 705/14.72 |
| 2016/0179945 A1* | 6/2016 | Lastra Diaz | G06F 17/30734 |
| | | | 707/739 |

OTHER PUBLICATIONS

Ge et al., Concept Similarity Matching Based on Semantic Distance, Retrieved from Internet: URL: http://disi.unitn.it/~p2p/RelatedWork/Matching/Ge_SKG%2708.pdf, Fourth International Conference on Semantics, Knowledge and Grid.

* cited by examiner

COMPUTING THE VALUE OF INFORMATION BETWEEN CONCEPTS

TECHNICAL FIELD

The present disclosure relates to computing the value of information between concepts, such as is needed when merging cross-domain ontologies or ordering search results.

BACKGROUND

When handling a query in a search engine, documents are sometimes ranked according to their information richness. Information richness is a measure of how much information a document contains relating to a topic. In the context of a search query, information richness will be defined by the topic as defined by the query which may contain multiple sub-topics; e.g. "new blockbuster movie".

US 2005/0246328 A1 "method and system for ranking documents of a search result to improve diversity and information richness" describes such a system as indicated by its title. A given document can be more or less rich either with respect to a given concept (provided for instance in a query) or intrinsically (without reference to any specific case). Richness on its own is limited as a metric for measuring the content value of a document, without reference to a specific concept.

To improve the handling of a query in a search engine, for example to find relevant documents and to rank them in order of relevance, it is known to use ontology, and specifically ontology between the domain of the search query and the domain of the target documents being searched.

An ontology is a representation of knowledge by a set of concepts and relationships between the concepts. Merging (i.e., associating) ontologies that address the same knowledge domain includes aligning the concepts and relationships of the schemas underlying the ontologies so as to create a mapping between the schemas. Merging ontologies that address different knowledge domains may include aligning the schemas underlying the ontologies by interacting with an end user and an upper reference ontology instead of a domain-specific ontology, or by ensuring that the schemas are built using the same method and the same reference ontology. When two schemas that are in the same domain or different domains are aligned, the schemas may be merged by connecting the concepts that are common to the two schemas. In the case of the schemas belonging to the same domain, a merging of the two schemas makes new structures (i.e., relationships) apparent, which completes the knowledge of the domain. In the case of the schemas belonging to different domains, the merging of the two schemas creates new cross-domain structures that do not exist in the individual schemas and that are potential sources of innovation.

The importance of merging ontologies of different domains, i.e. cross-domain ontologies, in order to find analogies is well known for recognizing value when comparing two domains.

U.S. Pat. No. 8,892,548 B2 ("Ordering Search-Engine Results"), which is hereby incorporated by reference in its entirety, proposes that in a given ontology, a "semantic value" is computed based on a distance between two concepts, wherein the distance measures the length of the chain between the two concepts and has a low value when the concepts are semantically closed. A relationship between a pair of concepts is represented by a chain of links. Each link of the chain connects two concepts. Concepts $C_1$ and $C_2$, for example, might be connected through a single link denoted ($C_1$,$C_2$). But if concepts $C_1$ and $C_4$ are connected through two intermediary concepts $C_2$ and $C_3$, the chain connecting $C_1$ and $C_4$ might be represented as a three-link chain. Each link is assigned a length which is an arbitrary value between 0 and 1 and serves to express the importance of the relationship between the two concepts it interconnects. A link between two equivalent concepts has a length of zero and two dissimilar concepts one. More generally, a link will have a length that is a function of the considered ontology.

U.S. Pat. No. 8,799,330 B2 ("Determining the value of an association between ontologies"), which is hereby incorporated by reference in its entirety, proposes to join two ontologies S1 and S2 representing two different domains, by importing into one of the ontologies (e.g. S1) those concepts of the second ontology (S2) that are considered significant for S1. (Here it is noted that in the art ontologies are sometimes referred to as schemas.) The concepts of S2 to be imported into S1 are those that have a relationship with the concepts Cc common to S1 and S2. The concepts to be imported are selected by a "significance" function that measures how important a concept C of S2 is for the concepts Cc shared by both S1 and S2. The higher is the significance between C and Cc, the higher is the need to import C. The significance function proposed in U.S. Pat. No. 8,799,330 B2 is inversely proportional to the distance between concepts, so in this example the distance between a concept C of S2 candidate to be imported and any of the concepts Cc shared between S1 and S2. The higher is the distance between C and Cc, the lower is the need to import C. The distance between two concepts C1 and Ci in a chain (C1 . . . Cn) is the length of the chain between C1 and Ci, i.e. the sum of the lengths of each of the direct links that connect two concepts.

FIG. 1 shows a number of shared concepts C1, C2, C3 and C4 between two ontologies which need to be joined, wherein the concepts are linked in a chain, and the lengths of the links in the chain represent a distance between concepts, in accordance with prior art. The concepts have the following distance values:

distance(C1,C2)=1, distance(C1,C3)=2, distance(C1,C4)=3

The higher is the length (i.e., distance between concepts), the weaker is the link between the concepts. A length equal to zero means that the link is very strong.

FIG. 2 shows a modified version of the same example as FIG. 1, but with different distance values, in accordance with prior art. In FIG. 2:

distance(C1,C2)=4, distance(C1,C3)=4, distance(C1,C4)=7

If we consider in this schema that C1 is one of the concepts common to S1 and S2 and that C2, C3, C4 are concepts of S2 which are candidates for possible import into S1, a system built with U.S. Pat. No. 8,799,330 B2 could decide to import C2 but not C4, because the distance between C1 and C2 (=4) is low enough to be considered as significant, while the distance between C1 and C4 (=7) is too high. If C2 is imported, then the system of U.S. Pat. No. 8,799,330 B2 would also automatically decide that C3 must also be imported, since their respective distances to C1 are identical (=4).

U.S. Pat. No. 8,799,330 B2 suggests therefore using a length close to zero between concepts that are semantically close. Two equivalent concepts would be distant by zero, and would be either both imported or both rejected. If the length zero is given to an association "is_a" (i.e. a parent-child association), then a parent is imported (or rejected) with all of its children. Insodoing, the "distance" used in U.S. Pat. No. 8,799,330 B2 to relate concepts is a kind of "semantic distance".

The term "semantic distance" is used in the literature as a measure of the similarity between concepts. Semantic distance can be normalized as a number in the range [0,1]. The similarity can then be defined as: one minus semantic distance (or any function that increases when the semantic distance decreases). Thus, the following rules prevail:

When the semantic distance between two concepts is zero, these two concepts are semantically equivalent; When the semantic distance between two concepts is unity/one, these two concepts are semantically dissimilar.

In between, when the semantic distance is between 0 and 1, the concepts are more or less similar. Concepts are more similar when the semantic distance between the concepts is close to 0, and less similar when the semantic distance between the concepts is close to 1.

Using semantic distance of this kind in U.S. Pat. No. 8,799,330 B2 therefore results in the import of concepts that are semantically close to the concepts common to S1 and S2.

A problem with the preceding approach of U.S. Pat. No. 8,799,330 B2 is that a relationship between concepts that represents a short semantic distance (showing that the concepts are semantically close through that relationship) does not carry much information. In fact, such a short semantic distance can tend to convey only information of a definitional nature that can be found in a dictionary. If needed, such information could be imported from a general-purpose dictionary and does not require the specific domain represented by S2. In an extreme case, that relationship could represent a semantic distance=0, meaning that the two concepts are actually identical, which makes no contribution, i.e. has no value, when looking for analogies between two domains. This problem is now explained some more with reference to a specific example.

FIG. 3 shows as concepts: Lettuce, Salad, Vegetable and Vegetarian linked by the associations: "is_a" and "eat", in accordance with prior art. In this example, the link between Lettuce and Vegetarian (showing that Vegetarian eats Lettuce) has more value, i.e. is more informative, than the link between Lettuce and Salad (showing Lettuce is a Salad, which is very general information of the kind available in a dictionary or from a taxonomy). The semantic distance might however lead to import Salad and Vegetable (because Salad and Vegetable are semantically close) but not Vegetarian, despite the fact that the link to Vegetarian has more intrinsic value.

What is needed is a way of comparing two concepts in which the information carried by a relationship between two concepts has more value when it expresses something other than merely a semantic relationship which one can find in the definitions provided by a general-purpose dictionary or in a taxonomical classification.

SUMMARY

Aspects of the present invention provide a method, and associated computer system and computer program product, for computing a value between two concepts in a schema containing a plurality of concepts which are linked to each other through associations.

One or more processors of the computer system input a schema S containing n concepts C1, C2 . . . Ci . . . Cn linked by associations, each such association forming a link in a chain connecting any two concepts of the n concepts, each such association having at least one semantic distance set in a range lying between a minimum semantic distance which indicates the two concepts are completely similar and a maximum semantic distance which indicates the two concepts are completely dissimilar, so that a semantic distance can be determined between said any two concepts of the n concepts by summing the at least one semantic distance between the two concepts, wherein the number of links in the chain that connects the concept C1 with another concept of the n concepts is a topological distance.

The one or more processors ascribe an information value between the concept C1 and a concept Ci+1 (i=1, 2 . . . , n−1), wherein the information value between the concept C1 and the concept Ci+1 depends on the semantic distance between the concept Ci and the concept Ci+1 and the informational distance between the concept C1 and the concept Ci.

If the concept Ci and the concept Ci+1 are separated by an association with a semantic distance above a threshold value, and are hence dissimilar concepts, then said one or more processors compute the informational distance between the concept C1 and the concept Ci according to a closeness using a first function that increases with topological distance between the concepts C1 and Ci and gives a lower informational distance with lower semantic distance between the concepts C1 and Ci.

If the concept Ci and the concept Ci+1 are not separated by the association with a semantic distance above the threshold value, and are hence similar concepts, then the one or more processors compute the informational distance between the concept C1 and the concept Ci according to a remoteness using a second function that increases with topological distance between the concepts C1 and Ci and gives a lower informational distance with higher semantic distance between the concepts C1 and Ci.

The one or more processors output the information value between the concept C1 and the concept Ci+1.

DETAILED DESCRIPTION

Before describing a concrete implementation, a thorough discussion of what properties should be possessed by an ideal computational method for assessing the information value between concepts is presented. Four separate constraints which the ideal computational method should fulfil are discussed.

The discussion takes place within the following nomenclature.

In a chain of concepts (C1, . . . , Cn) where each concept Ci has a relationship with the next concept Ci+1, the information value between C1 and Cn depends: directly on the value of the relationship between Cn and Cn−1; and inversely on the informational distance between C1 and Cn−1. The informational distance between the two concepts C1 and Cn is computed through a process that considers together: the number of pairs (Ci, Ci+1) between C1 and Cn, the value of the relationship between each of these pairs, and the semantic distance between each of these pairs. The desired constraints that our computational method will fulfil are now each discussed in turn.

Moreover, the topological distance between C1 and Ci along a chain that joins C1 and Ci is defined as the number of links between the C1 and Ci. The topological distance therefore increases by a fixed increment of 1 each time there is an additional link on the chain. The longer the chain, the longer topological distance.

A first constraint, Constraint #1 is now discussed.

Figure 1:
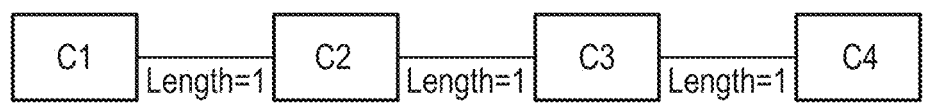
FIG. 1 shows a number of shared concepts C1, C2, C3 and C4 between two ontologies which need to be joined, wherein the concepts are linked in a chain, and the lengths of the links in the chain represent a distance between concepts, in accordance with prior art.
Figure 2:
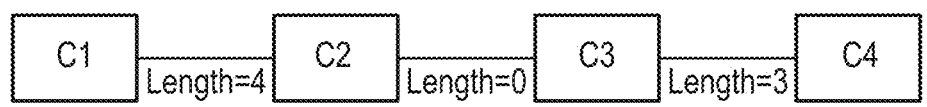
FIG. 2 shows a modified version of the same example as FIG. 1, but with different distance values, in accordance with prior art.
Figure 3:
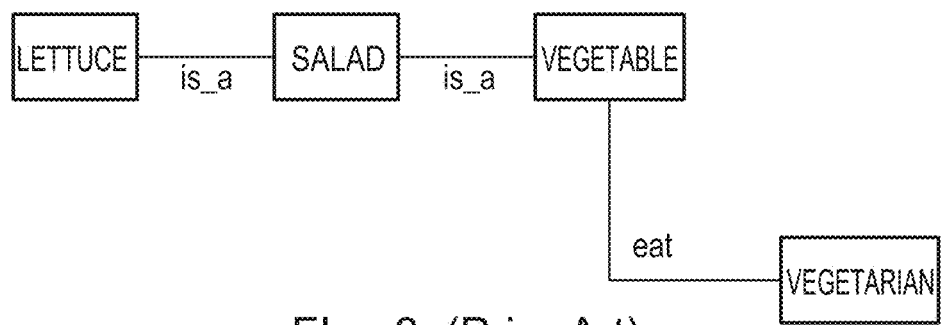
FIG. 3 shows as concepts: Lettuce, Salad, Vegetable and Vegetarian linked by the associations: "is_a" and "eat", in accordance with prior art.
Figure 4:
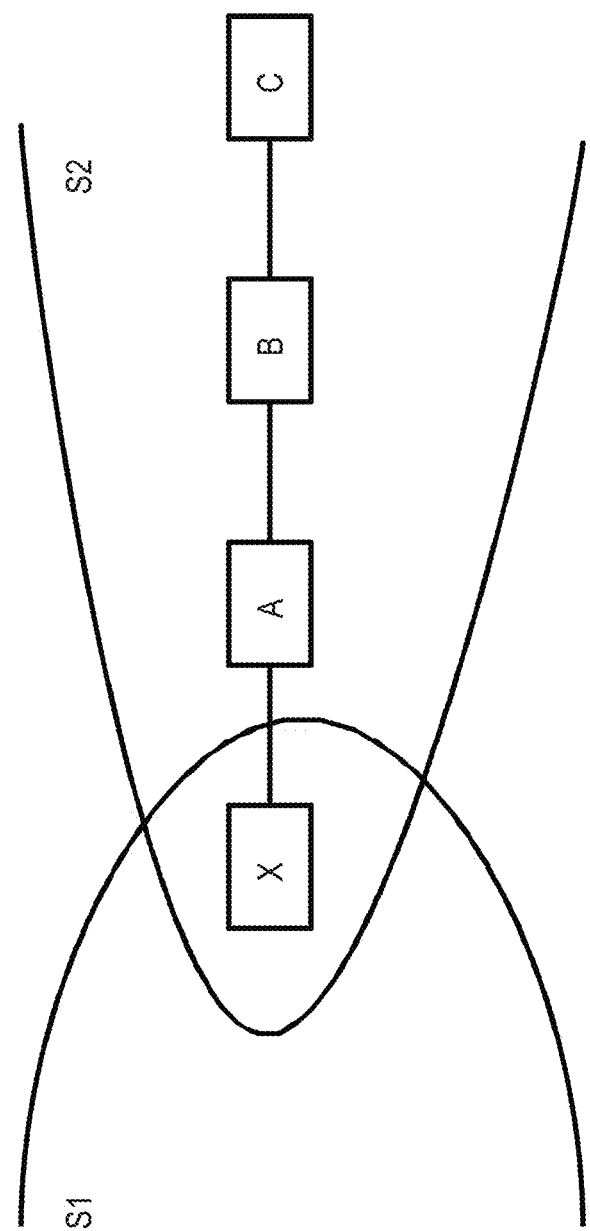
FIG. 4 shows concepts to illustrate a first constraint, in accordance with embodiments of the present invention.

FIG. 4 shows concepts to illustrate a first constraint, in accordance with embodiments of the present invention. FIG. 4 schematically shows a conceptual relationship between a first ontology S1 and a second ontology S2 representing two different domains. A concept X is shared or common between S1 and S2. Moreover, in S2 the concept X is related to further concepts A, B and C in a chain X-A-B-C. Concepts A, B and C are examples of concepts Ci. Along the chain what is desired is:

Information_value $(X,A)$>Information_value $(X,B)$
>Information_value $(X,C)$

Indeed, it is desired that the information value of C for X be less than the information value of B or A for X. In general, the longer the link between Ci and X, the lower should be the value of Information_value $(X,Ci)$. The information value varies inversely with the informational distance, where varies inversely is not meant to imply the mathematical inverse function, but rather only that when information value increases then informational distance decreases.

Consider an arbitrary chain of concepts $C1, C2, \ldots Cn$. The information value on the chain at point 'n', i.e. Information_value $(C1,Cn)$, is equal to the value of the relationship linking the last pair $(Cn-1,Cn)$ divided by the distance between this last pair and C1, which can be expressed by the following formula:

Information_value $(C_1,C_{i+1})$=Value_of_link$(C_i,C_{i+1})$/
[1+Informational_distance $(C_1,C_i)$]

If Informational_distance=0, then:

Information_value $(C_1,C_{i+1})$=Value_of_link$(C_i,C_{i+1})$

It is desired that Informational_distance follow the constraint that: the higher is the informative liaison between two concepts, the lower must be their distance (i.e. the shorter is the Informational_distance, the more informative is the liaison); and the lower is the informative liaison between two concepts, the higher must be their distance (i.e., the longer is the Informational_distance, the less informative is the liaison). This constraint provides more information value to the concept Ci when its liaison with C1 is more informative (meaning when its informational distance with C1 is low). The Semantic Distance known in the Prior Art does not support this constraint and thus cannot be used.

Figure 5:
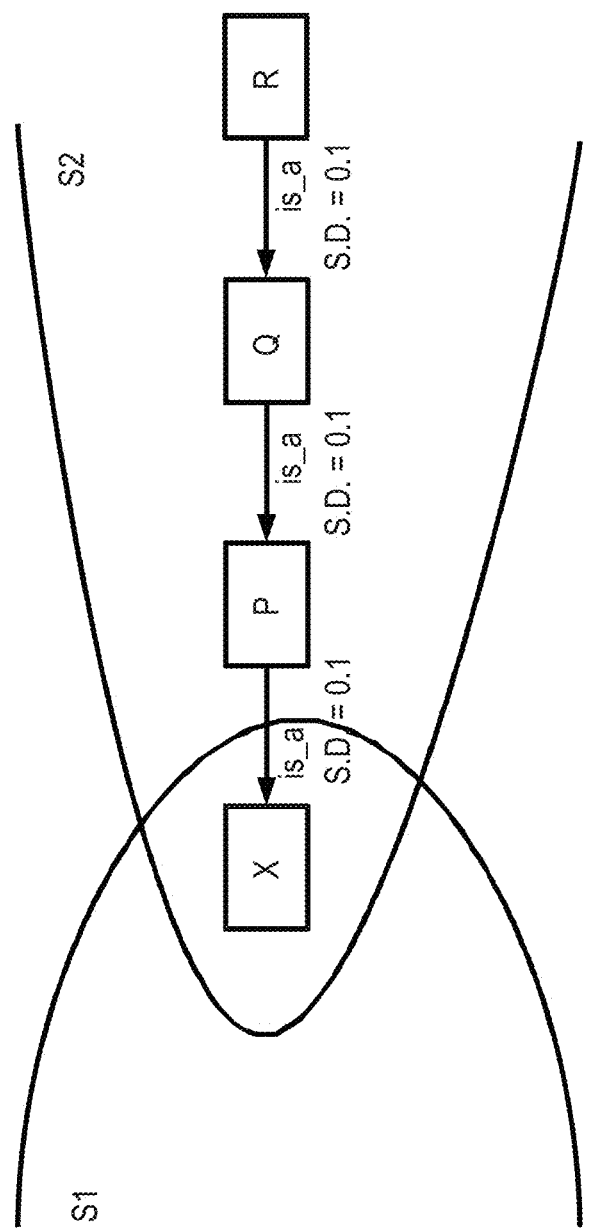
FIG. 5 shows concepts to further illustrate the first constraint, in accordance with embodiments of the present invention.

FIG. 5 shows concepts to further illustrate the first constraint, in accordance with embodiments of the present invention. FIG. 5 illustrates this constraint by reproducing FIG. 4 with some values for semantic distance, SD, and some concrete association or relationship, namely "is_a". An "is_a" relationship indicates typically some similarity between the concepts it links and therefore should carry a short Semantic Distance. Suppose the Semantic Distance between two concepts linked by "is_a" is 0.1 as illustrated. One can say that R is still semantically very close to X, despite of the number of links in between. The Semantic Distance (X,R) is indeed only 0.3. However, none of the concept P, Q or R is considered to have a value for X. Such taxonomic relationships are indeed typically not core to a specific domain (here the domain described in S2). The possible value that P, Q or R could bring to X might be independent from S2 and may very well be brought from other upper ontologies, such as for instance from WordNet, or from a dictionary. In the extreme case when the Semantic Distance carried by a relationship is zero, the concepts are equivalent (i.e., synonyms).

Figure 6:
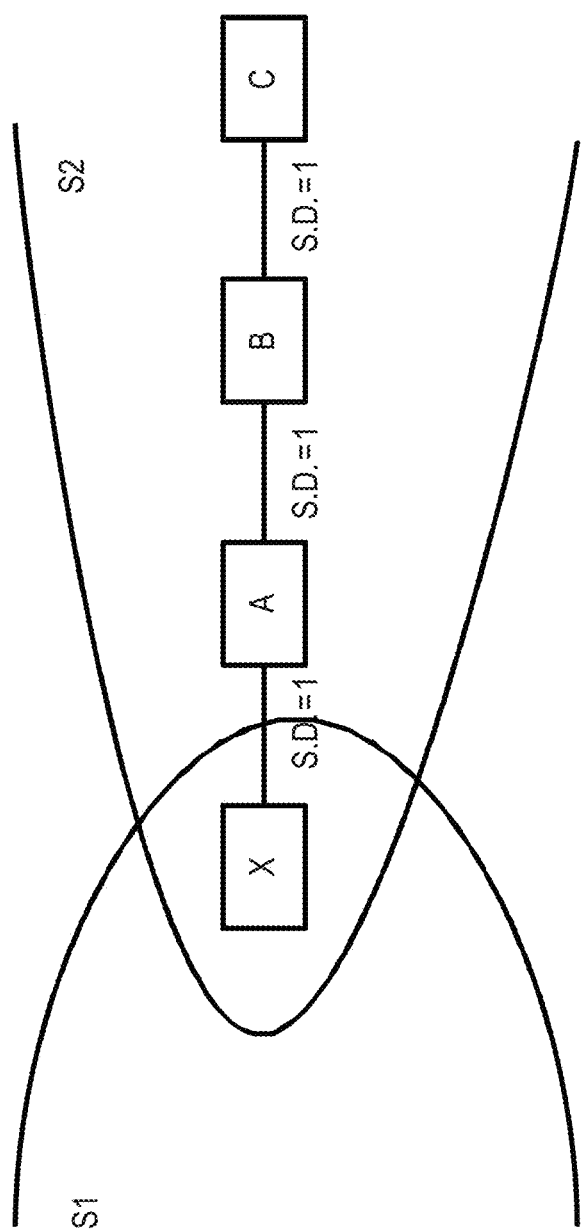
FIG. 6 shows concepts to still further illustrate the first constraint, in accordance with embodiments of the present invention.

FIG. 6 shows concepts to still further illustrate the first constraint, in accordance with embodiments of the present invention. FIG. 6 shows an alternative conceptual relationship between a first ontology S1 and a second ontology S2 representing two different domains. A concept X is shared or common between S1 and S2. Moreover, in S2 the concept X is related to further concepts A, B and C in a chain X-A-B-C. However, the concepts X, A, B and C are dissimilar and so the semantic distance between two consecutive concepts of this set is close to one. In this example, the semantic distance is considered to be one. The link between X and A is considered to have more information value than the link between X and P (of FIG. 5), because A brings more "S2 specific" information. It is desired that:

Information_value (X,A)>Information_value (X,P)

or

Informational_distance (X,A)<Informational_distance (X,P)

Therefore, the Semantic Distance cannot be used as Informational Distance, since doing so would give more information value to P than to A. It is tempting to think of Informational Distance as the opposite of Semantic Distance; i.e. a function that increases when the Semantic Distance decreases; i.e. something like a Semantic Similarity (=1−Semantic Distance). However, when the two concepts are not consecutive, it is not appropriate to use either the similarity or the inverse of the Semantic Distance to measure Informational_distance, since doing so attributes more information value to X, for instance, on the 'remote' concept R than on P. Namely:

Similarity (X,P)=0.9>0.7=Similarity (X,R)

Figure 7:
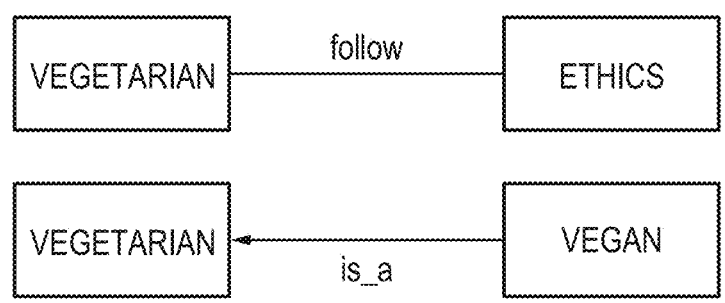
FIG. 7 shows a first example illustrating the first constraint, in accordance with embodiments of the present invention.

FIG. 7 shows a first example illustrating the first constraint, in accordance with embodiments of the present invention. FIG. 7 shows a concrete example in the field of gastronomy of a taxonomic-like relationship and a more oblique relationship which will be referred to as non-taxonomic. The concept Vegetarian is semantically dissimilar from Ethics (i.e., the schema does not show any taxonomic relationship between Vegetarian and Ethics), but Vegetarian is not dissimilar from Vegan (as linked with the relationship "is_a"). Vegan must therefore have less value to Vegetarian than does Ethics. The relationship "Vegan is_a Vegetarian" is a rather general statement that one could find in another general dictionary or taxonomy (like in Word-Net).

It is noted that the above examples have dealt with a single chain of concepts. In a real problem, in order to identify the actual Information Value between two concepts, all chains between the two concepts should be considered. Indeed, one chain connecting two concepts could have value whereas another chain might not have value.

Figure 8:
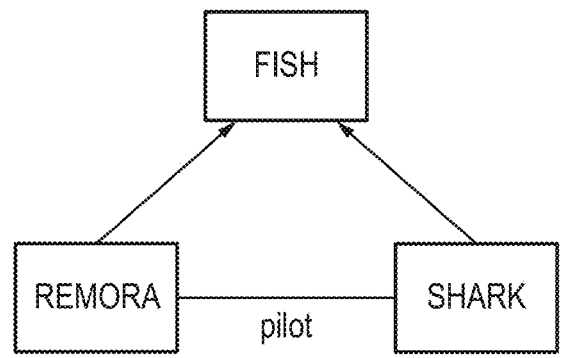
FIG. 8 shows a second example illustrating the first constraint, in accordance with embodiments of the present invention.

FIG. 8 shows a second example illustrating the first constraint, in accordance with embodiments of the present invention. FIG. 8 shows an example of similar concepts which have a taxonomic relationship, but which can nevertheless have value for each other via being linked through a non-taxonomic relationship. The concepts are Fish, Shark and Remora. The concepts Remora and Shark are not dissimilar. Remora and Shark are even semantically close, because Remora and Shark are both Fishes and their Semantic Distance=0.2 (via the path [Remora,is_a,Fish]+[Shark, is_a,fish]). However Shark is significant for, or has value to, Remora, by virtue of the more informative path: [Remora, pilot, fish]. This example also shows that in a schema, the Informational_Distance depends on the path along which the Informational_Distance is calculated. In this specific example, the following constraint is desired:

Informational_Distance (Remora,Shark) on path ([Remora,is_a,Fish]+[Shark,is_a,fish])>Informational_Distance (Remora,Shark) on path ([Remora,pilots,Fish])

In summary, under Constraint #1, along a chain of S2 concepts beginning with one common/similar concept $C_1$, the Information_value $(C_1,C_{i+1})$ where $C_{i+1}$ is in the chain, depends upon: the value of the link between $C_i$ and $C_{i+1}$ and a certain distance between $C_1$ and $C_i$. The certain distance is called the "informational distance".

In addition, under Constraint #1, the following features pertain to the informational distance: (i) the concepts $C_{i+1}$ of S2 that are distant from the common/similar concept $C_1$ have less value than those that are close to $C_1$; (ii) Semantic Distance cannot be used as a measure of the value of the link between $C_i$ and $C_{i+1}$ or the distance between $C_1$ and $C_i$; and (iii) A similarity function cannot be used as a measure of the distance between $C_1$ and $C_i$.

A second constraint, Constraint #2 is now discussed. The preceding discussion has established that Semantic Distance cannot be used to measure the value of the relationship between the common concept X and another concept Ci of S2. One might think of using instead Topological Distance defined as the number of links between concepts.

Figure 9A:
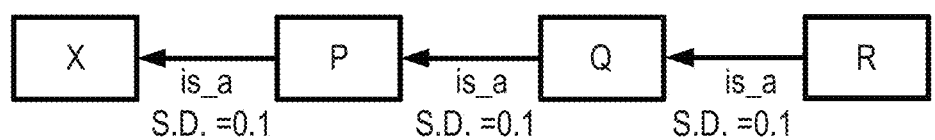
FIG. 9A, FIG. 9B and FIG. 10 show limitations in use of topological distance for measuring relationship value and are provided for discussing a second constraint, in accordance with embodiments of the present invention.
Figure 9B:
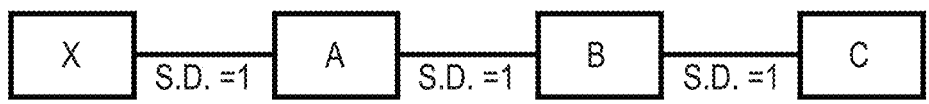
Figure 10:
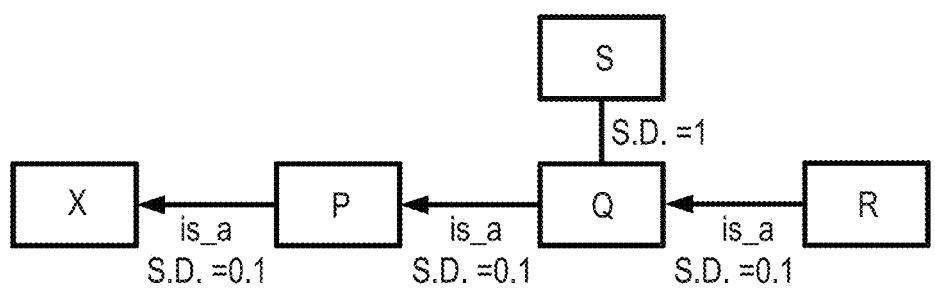

FIG. 9A, FIG. 9B and FIG. 10 show limitations in use of topological distance for measuring relationship value and are provided for discussing a second constraint, in accordance with embodiments of the present invention.

FIG. 9A shows an association chain X-P-Q-R between similar concepts, each concept associated with an "is_a" relationship and thus Semantic Distance=0.1. FIG. 9B shows another chain X-A-B-C between dissimilar concepts with Semantic Distance=1. Here we see that Topological Distance cannot be an acceptable solution, since it would give the same distance between (X,R) and between (X,C), while it is desired that Informational_distance $(X,C)$<Informational_distance $(X,R)$ FIG. 10 shows an association linkage which incorporates the same X-P-Q-R chain of FIG. 9A and also includes an additional concept S which is dissimilar to Q with a Semantic Distance to Q=1. Topological Distance would give the same distance between (X, R) and (X,S). The concept S brings some value to the concept Q. Because Q is semantically very close to X, it will be considered that the concept S brings also value to X. It is desired therefore that the Semantic Distance plays a role in some cases.

Figure 11:
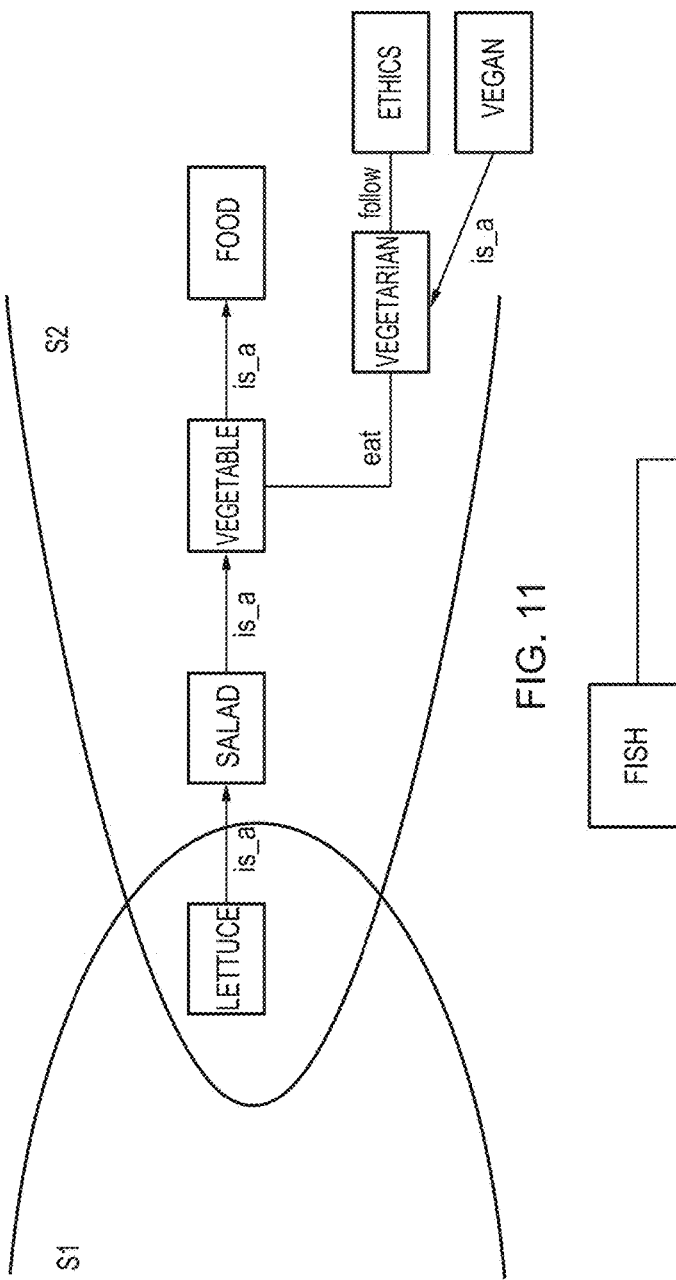
FIG. 11 and FIG. 12 show first and second examples illustrating the second constraint, in accordance with embodiments of the present invention.
Figure 12:
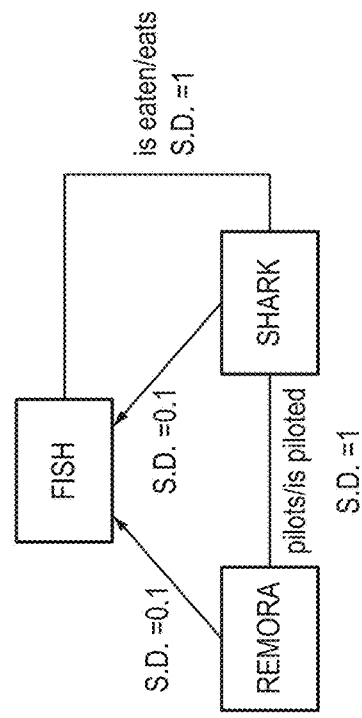

FIG. 11 and FIG. 12 show first and second examples illustrating the second constraint, in accordance with embodiments of the present invention.

FIG. 11 shows a concrete example using again the gastronomical theme. There are ontologies S1 and S2 with a shared concept Lettuce which is linked in a taxonomical chain of "is_a" relationships with the S2-only concepts of Salad, Vegetable and Food in turn. The S2-concept Vegetarian has one link "eat" to the concept Vegetable, this link being non-taxonomic. Vegan is an S2-concept associated by an "is_a" relationship to Vegetarian. Ethics is the final S2 concept and is linked to Vegetarian by a non-taxonomical link which is a "follow" association. According to Constraint #1, one must consider Vegetarian has some value for Vegetable. Vegetarian must have a higher value to Vegetable than Ethics does, for instance. Ethics is indeed separated from Vegetable by two non-taxonomical links, so Ethic's distance to Vegetable is greater. On the other hand, Vegetable is semantically close to Lettuce, as Vegetable's semantic distance to Lettuce is only 0.2 (considering that a "is_a" relationships introduces a distance=0.1). As consequence, it is desired that Vegetarian have some value for every concept in the chain Lettuce-Vegetable. Even though the Lettuce-Vegetable chain has in itself no value for Lettuce, the Lettuce-Vegetable chain brings value, since the Lettuce-Vegetable chain is the path by which the concept Vegetarian can connect to Lettuce.

FIG. 12 shows another example using again the fish theme. Compared to FIG. 7 there is added an additional non-taxonomic link, namely that "Shark eat Fish" (or "Fish [are] eaten [by] Shark"). It is desired that the following constraint be satisfied:

Informational_distance (Remora,Shark) on path ([Remora,is_a,Fish]+[Shark,is_a,fish])>Informational_distance (Remora,Shark) on path ([Remora,is_a,Fish]+[Fish,is eaten, Shark])>Informational_distance (Remora,Shark) on path ([Remora,pilots,Fish])

In summary, under Constraint #2, in the chain C1,C2, ... Cn, a very short Semantic Distance between two concepts Ci and Cj must strengthen the value between Ci and the other concepts which are linked to Cj but are dissimilar to Cj.

A third constraint, Constraint #3, is now discussed. Focus is now on the function Value_of_link (Ci, Ci+1) that appears in the formula:

Information_value $(C1,Ci+1)$=Value_of_link $(Ci,Ci+1)$/[1+Informational_distance $(C1,Ci)$]

The parameter Link_Weight is defined as follows between two consecutive concepts:

Link_Weight $(Ci,Ci+1)$=Semantic_Distance $(Ci,Ci+1)$

With the parameter Link_Weight, less weight is assigned to a link when some similarity is represented in the concepts (like with the taxonomic relationship "is_a"). However, the default values can be adapted by the end-user. For example, the end user could adapt the default values automatically with a self-learning system, but this is peripheral to the present disclosure. The end-user can assign a higher weight to relationships that the user considers more important in the user's universe of discourse.

Figure 13A:
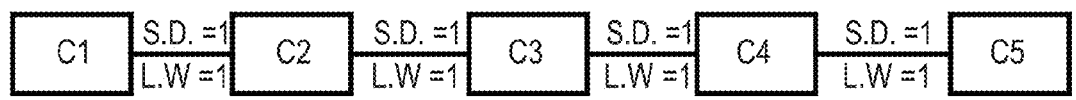
FIG. 13A and FIG. 13B illustrate a third constraint, in accordance with embodiments of the present invention.
Figure 13B:
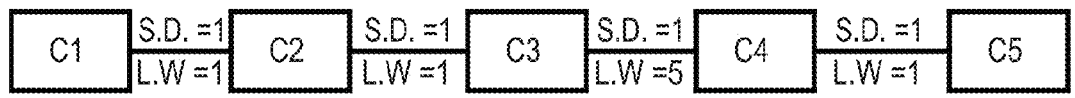

FIG. 13A and FIG. 13B illustrate a third constraint, in accordance with embodiments of the present invention. FIG. 13A and FIG. 13B show two schemas of linked concepts C1 to C5 which are identical except that in the second case of FIG. 13B, the link between C3 and C4 is more important than in the first case of FIG. 13A; i.e. has a higher Link_Weight. (Link_Weight is labelled L.W. in the figures.) It is desired that the Value_of_Link (C3, C4) is higher in the second case than in the first case. It is further desired that the value of the next link, Value_of_Link (C4, C5) is more important as a result of the preceding link having a high value. That is to say, it is desired that C5 be more (less) significant to C1 when C5 is linked to a concept that has a strong (weak) relationship in the chain towards C1.

A fourth constraint, Constraint #4, is now discussed.

When a relationship between two concepts Ci and Ci+1 of S2 is extremely strong, it is desired that Ci and Ci+1 either to be both imported into S1 or both rejected from import. This can be the case for instance when the concepts are linked with the "has_attribute" or "has_value" relationships. It is desired that these concepts have the same Information_values to $C_1$. For these specific links, the end-user can set the link weight to a maximum value; i.e.:

Link_Weight $(Ci,Ci+1)$=MAX where «MAX» is just a string, meaning that Ci and Ci+1 are so tightly linked that Ci and Ci+1 should be given the same information value. For such cases, it is desired that the method force the following outcome:

Informational_distance $(C1,Ci)$=Informational_distance$(C1,Ci-1)$

Value_of_Link $(Ci,Ci+1)$=Value_of_Link$(Ci-1,Ci)$

Constraint #4 thus makes it possible to specify when two concepts are so tightly linked that the the two concepts should receive the same amount of information value with respect to a further concept to which the two concepts are both linked in a consecutive relationship.

What is now desired are definitions for Informational_distance and Value_of_Link that satisfies all four constraints. From Constraint #1 there is the following formula:

Information_value $(C_1,C_{i+1})$=Value_of_link$(C_i,C_{i+1})$/[1+Informational_distance $(C_1,C_i)$]

As per the constraints #1 and #2, the "Informational_distance" cannot be equivalent to any one measure of the following three measures: A semantic distance measure; A similarity measure; A topological distance measure.

Informational_distance should, however, be a combination of the preceding three measures In addition:

Value_of_link $(C1,C2)$=Semantic_distance $(C1,C2)$

And for $i>=2$:

Value_of_link $(Ci,Ci+1)$=[Semantic_distance $(Ci,Ci+1)$+Value_of_link $(Ci-1,Ci)$]/2

The above definition of "Value_of_link" is just an example of a function that satisfies the constraint #3. Other functions might refer to Link_Weight instead of Semantic_distance. Other functions might refer to the inverse of the Semantic_distance. Yet other functions might compute the value of a link L as an average value computed on the Link_Weight, Semantic_distance or inverse of Semantic_distance values of the links neighboring the link L. For instance Value_of_link $(C1,C2)$=Function [Semantic_distance $(C1,C2)$]

and for $i>=2$:

Value_of_link $(Ci,Ci+1)$=Function [Semantic_distance $(Ci,Ci+1)$]+Value_of_link $(Ci-1,Ci)$]/2.

Another example of average for $i>=2$ could be

Value_of_link $(Ci,Ci+1)$=($\Sigma$[Function (Semantic_Distance $(Cm,Cm+1)$])/$i$ m=1 to i The above is a full set of mathematical relationships for computing informational distance and informational value, albeit one that does not yet incorporate Constraint #4, in that it is limited to the default case that:

Link_Weight $(Ci,Ci+1)$=Semantic_Distance$(Ci,Ci+1)$

Using this full set of mathematical relationships, it is chosen that for a link between Ci and Ci+1, when Ci and Ci+1 are dissimilar concepts (i.e. when their semantic distance is equal or close to 1 or above a given threshold between 0 and 1), the informational distance from C1 to Ci is computed using a first function, which is called a closeness factor, that gives a higher (/lower) informational distance with higher (/lower) semantic distance between C1 and Ci, but when Ci and Ci+1 are not dissimilar concepts (i.e when their semantic distance is equal or close to 0 or below a given threshold between 0 and 1), the informational distance from C1 to Ci is computed using a second function, which is called a remoteness factor, that gives a higher (/lower) informational distance with lower (/higher) semantic distance between C1 and Ci.

When applied between two concepts C1 and Ci in a chain of concepts, both the first and second functions increase with the topological distance between C1 and Ci (i.e. with the number of links or concepts between C1 and Ci.

That is in the one case, where the next link is between dissimilar concepts, higher informational distance is attributed to semantic remoteness (and lower informational distance is attributed to semantic closeness) and in the other case, where the next link is between non-dissimilar concepts, a higher informational distance is attributed to semantic closeness (and lower informational distance is attributed to semantic remoteness). To be more specific:

when Ci and Ci+1 are dissimilar concepts (i.e. when they have a semantic distance equal or close to 1, or above a given threshold between 0 and 1), the informational distance is calculated as follows:

Informational_distance $(C1,Ci)$=Closeness_Factor $(C1,Ci)$

Closeness_Factor$(C1,Ci+1)$=Closeness_Factor$(C1,Ci)$+Semantic_Distance $(Ci,Ci+1)$/(1+Semantic_Distance $(Ci,Ci+1)$)

where

Closeness_Factor $(C1,C1)$=0

When Ci and Ci+1 are not dissimilar concepts (i.e. when Ci and Ci+1 have a semantic distance equal or close to 0, or below a given threshold between 0 and 1), the informational distance is calculated as follows:

Informational_distance $(C1,Ci)$=Remoteness_Factor $(C1,Ci)$

Remoteness_Factor $(C1,Ci+1)$=Remoteness_Factor $(C1,Ci)$+1/(1+Semantic_Distance $(Ci,Ci+1)$)

where
Remoteness_Factor $(C1,C1)$=1
The specific relations used for the remoteness and closeness factor are as follows:
Remoteness_Factor$(C1,C1)$=1
And for $i>=2$:

$$\text{Remoteness\_Factor}(C1, Ci) = 1 + \sum_{m=1 \text{ to } i-1} [1/(1 + \text{Semantic\_Distance}(Cm, Cm+1)]$$

Closeness_Factor$(C1, C1)$ = 0

And for $i>=2$:

$$\text{Closeness\_Factor}(C1, Ci) = \sum_{m=1 \text{ to } i-1} [\text{Semantic\_Distance}(Cm, Cm+1)/(1 + \text{Semantic\_Distance}(Cm, Cm+1)]$$

The above pair of functions is just an example. Any pair of functions that follows the properties described below is valid.

As per the explanations provided in the previous sections, none of the functions Remoteness_Factor and Closeness_Factor should be equivalent to: A semantic distance measure; A similarity measure; A topological distance measure.

The functions Remoteness_Factor and Closeness_Factor should however be a combination of the preceding three measures, to satisfy the constraints #1 and #2

The Remoteness_Factor increases with the topological distance.

When computed between two consecutive nodes, the Remoteness_Factor increases when the semantic distance between the nodes decreases The Closeness_Factor increases with the topological distance.

When computed between two consecutive nodes, the Closeness_Factor increases when the semantic distance between the nodes increases.

Figure 14:
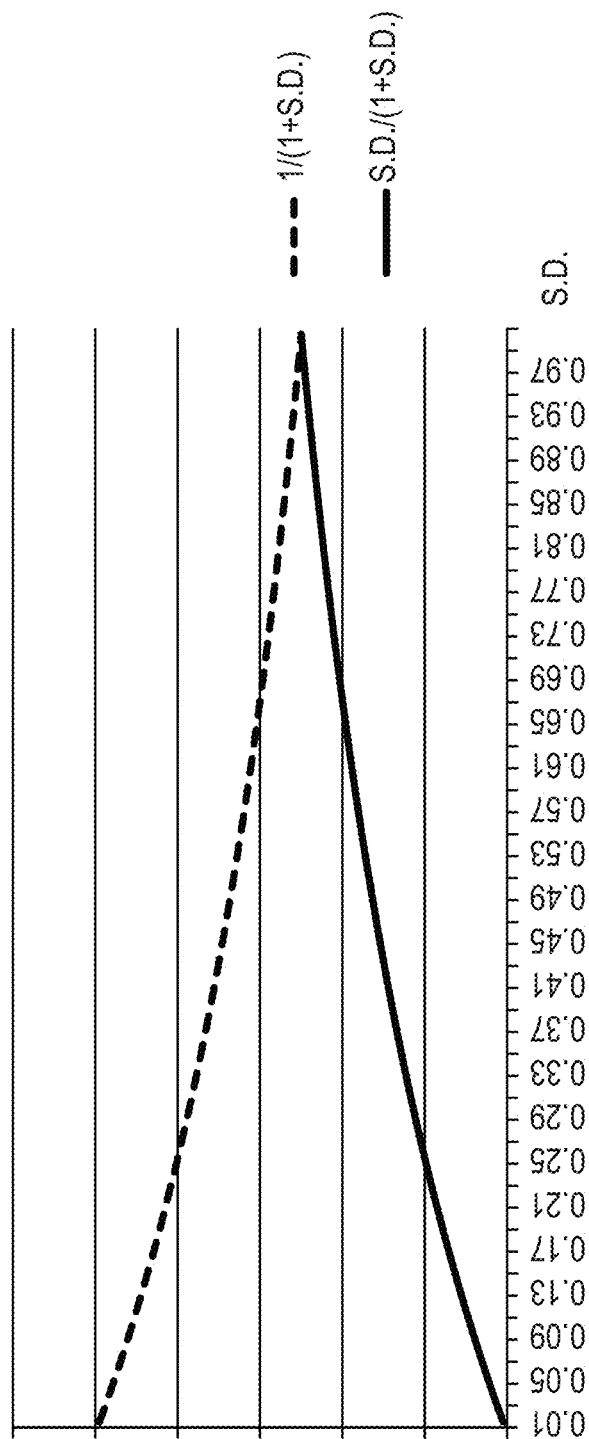
FIG. 14 is a graph illustrating two functions that can be used in the computation of the informational distance, in accordance with embodiments of the present invention.

The Remoteness_Factor and the Closeness_Factor are such that Remoteness_Factor>=Closeness_Factor It is important that the two functions for remoteness and closeness increase with topological distance, because informational distance should increase with topological distance in order to ensure that informational value decreases. In other words, in a given chain, the higher the number of concepts or links between two concepts, the lower should be the informational value between those two concepts. The Remoteness_Factor and Closeness_Factor described in the previous sections comply with these criteria, as they are based on the functions shown in FIG. 14 which is a graph illustrating two functions that can be used in the computation of the informational distance, in accordance with embodiments of the present invention.

Taking account of Constraint #4, the calculation of both informational distance and information value is additionally modified.

Namely, the calculation of informational distance is modified to force the informational distance to the next concept in a chain to be the same as the previous one; i.e. force Informational_distance (C1, Ci−1) to be identical to Informational_distance (C1, Ci), in cases when the concepts are deemed to be equivalent. Specifically, if:

Link_Weight $(Ci,Ci+1)$=MAX

Then

Informational_distance $(C1,Ci)$=Informational_distance $(C1,Ci-1)$,

Else

Informational_distance (C1, Ci) is computed using the remoteness or closeness factor as specified above depending on whether the concepts Ci and Ci+1 are dissimilar or not.

Moreover, the calculation of information value is additionally modified to take account of Constraint #4 by forcing Value_of_Link of the next link to be the same as that for the previous link when the link weight, Link_Weight, has been given the maximum value MAX. Otherwise, Value_of_Link of the next link is taken as the average of the previous Value_of_Link and the next Link_Weight. That is to say:

Value_of_link$(C1,C2)$=Link_Weight$(C1,C2)$

And for i>=2
  if Link_Weight(Ci, Ci+1)=MAX

Value_of_Link$(Ci,Ci+1)$=Value_of_Link$(Ci-1,Ci)$ if Link_Weight(Ci,Ci+1)< >MAX

Value_of_Link$(Ci,Ci+1)$=[Link_Weight$(Ci,Ci+1)$+ Value_of_Link$(Ci-1,Ci)$]/2

Figure 15:
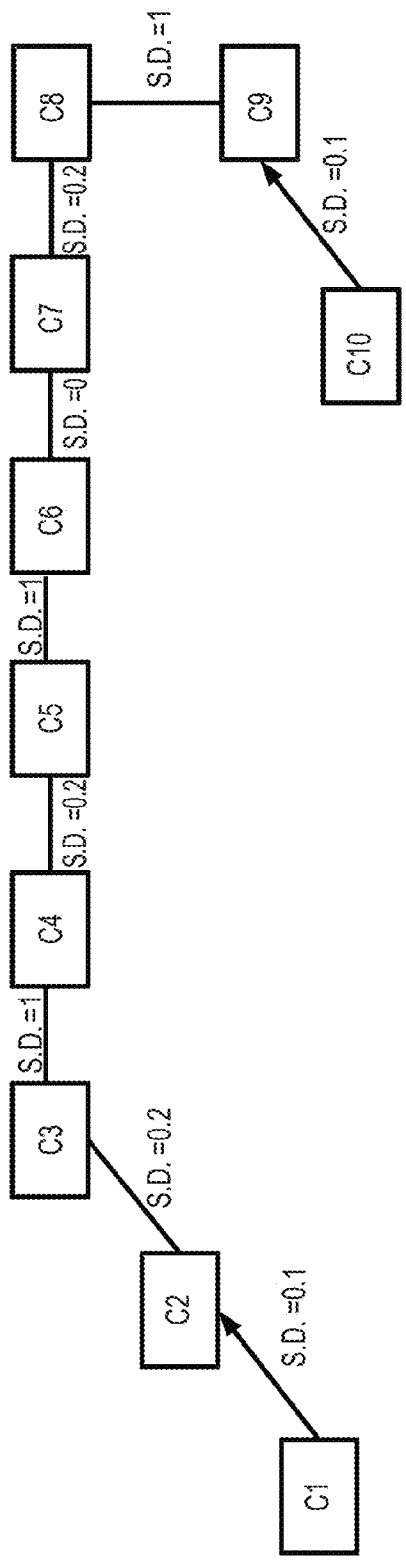
FIGS. 15 and 16 are first and second examples, respectively, of input to a computation process employing four constraints, in accordance with embodiments of the present invention.
Figure 16:
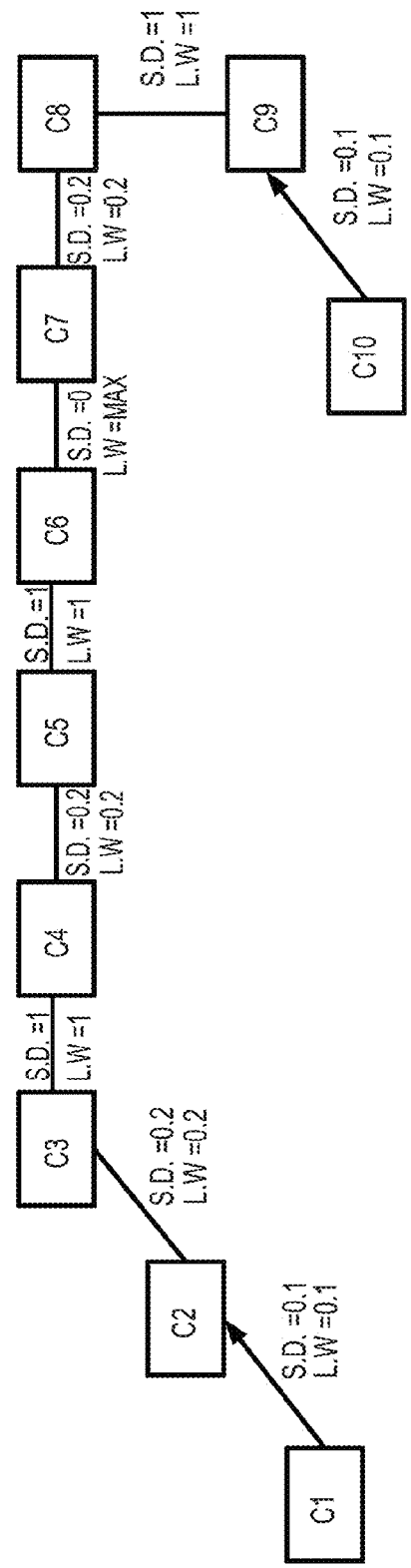

FIGS. 15 and 16 are first and second examples, respectively, of input to a computation process employing four constraints, in accordance with embodiments of the present invention.

FIG. 15 and FIG. 16 shows a concrete example schema of concepts C1 to C10 linked in a chain with various semantic distances, S.D., between C1 and C10, some being dissimilar (S.D.=1) and some being "is_a" associations (S.D.=0), and others having intermediate values (e.g. S.D.=0.2). FIG. 16 differs from FIG. 15 only in that the link weight values, L.W., between concepts are additionally indicated.

Applying the above formulae, the informational distances between the concept C1 and the concepts C1 to C9 are then as stated in the following Table 1:

TABLE 1

| between . . . | Semantic_Distance | between . . . | Remoteness_Factor | Closeness_Factor | Informational_Distance |
|---|---|---|---|---|---|
| C1, C1 | 0 | C1, C1 | 1 | 0 | 1 |
| C1, C2 | 0.1 | C1, C2 | 1.91 | 0.09 | 1.91 |
| C2, C3 | 0.2 | C1, C3 | 2.74 | 0.26 | 0.26 |
| C3, C4 | 1 | C1, C4 | 3.24 | 0.76 | 3.24 |
| C4, C5 | 0.2 | C1, C5 | 4.08 | 0.92 | 0.91 |
| C5, C6 | 1 | C1, C6 | 4.58 | 1.42 | 4.58 |
| C6, C7 | 0 | C1, C7 | 5.58 | 1.42 | 5.58 |
| C7, C8 | 0.2 | C1, C8 | 6.41 | 1.59 | 1.59 |
| C8, C9 | 1 | C1, C9 | 6.91 | 2.09 | 6.91 |
| C9, C10 | 0.1 | C1, C10 | 7.82 | 2.18 | |

For transparency, in the Informational_Distance column, those values that come from closeness are right-justified, and those values that come from remoteness are left-justified.

Applying the above formulae, the informational values between the concept C1 and the concepts C1 to C10 are then as stated in the following Table 2:

TABLE 2

| Between: | Informational_Distance | Between: | Value_of_Link | Between: | Information_value |
|---|---|---|---|---|---|
| C1, C1 | 1 | | | | |
| C1, C2 | 1.91 | C1, C2 | 0.1 | C1, C2 | 0.05 |
| C1, C3 | 0.26 | C2, C3 | 0.15 | C1, C3 | 0.05 |
| C1, C4 | 3.24 | C3, C4 | 0.58 | C1, C4 | 0.46 |
| C1, C5 | 0.91 | C4, C5 | 0.39 | C1, C5 | 0.09 |
| C1, C6 | 0.91 | C5, C6 | 0.70 | C1, C6 | 0.37 |
| C1, C7 | 5.58 | C6, C7 | 0.70 | C1, C7 | 0.37 |
| C1, C8 | 1.59 | C7, C8 | 0.45 | C1, C8 | 0.07 |
| C1, C9 | 6.91 | C8, C9 | 0.73 | C1, C9 | 0.28 |
| C1, C10 | | C9,C10 | 0.42 | C1, C10 | 0.05 |

Note that the distance between C1 and C6 has been set equal to the distance between C1 and C5, because of the Link_Weight value of MAX between C6 and C7.

For transparency, Value_of_Link and Information_Value columns have right-justified values that have been affected by forced equivalence through Link_Weight=MAX, and left-justified values that would have been the same without this additional constraint of Constraint #4; i.e. those with Link_Weight< >MAX.

Figure 17:
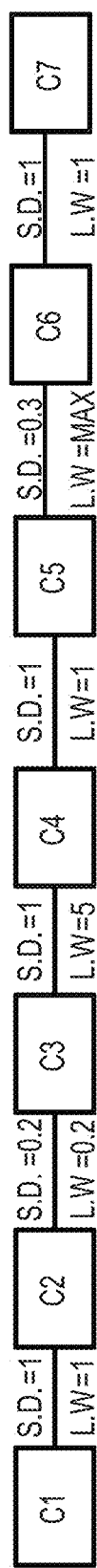
FIG. 17 is a third example of input to a computation process employing four constraints, in accordance with embodiments of the present invention.

FIG. 17 is a third example of input to a computation process employing four constraints, in accordance with embodiments of the present invention. FIG. 17 shows another concrete example schema of concepts C1 to C7 linked in a chain with various semantic distances, S.D., and link weights, L.W., between them. Applying the above formulae, the informational distances and information values between the concept C1 and the concepts C1 to C7 are then as stated in the following Table 3:

TABLE 3

| Between: | Informational_Distance | Between: | Value_of_Link | Between: | Information_value |
|---|---|---|---|---|---|
| C1, C1 | 0 | | | | |
| C1, C2 | 0.5 | C1, C2 | 1 | C1, C2 | 1.00 |
| C1, C3 | 0.67 | C2, C3 | 0.6 | C1, C3 | 0.40 |
| C1, C4 | 1.17 | C3, C4 | 2.8 | C1, C4 | 1.68 |
| C1, C5 | 1.17 | C4, C5 | 1.9 | C1, C5 | 0.88 |
| C1, C6 | 1.9 | C5, C6 | 1.9 | C1, C6 | 0.88 |
| C1, C7 | | C6, C7 | 1.45 | C1, C7 | 0.50 |

The examples above show that the computation process provides Information_values that satisfy the constraints formulated in the above discussion. Specifically, along a chain, the computation process provides that Information_value (C1, Ci) increases or decreases (when the index i increases), depending on the semantic distances, the weight of the links and the number of concepts in the chain.

It is noted that, generally in this document that two "dissimilar concepts" mean concepts whose semantic distance is above a given threshold, for which the default value could be set to 0.5 by way of example. Moreover, "similar concepts mean concepts whose semantic distance is below a given threshold, for which the default value could be set to 0.5 by way of example.

An example implementation of the above-described method for computing a value between two concepts is now described, where the application is for ranking of search engine results. Namely, the present search engine ranking example provides a method, a computer system, a computer program product, and a service that allow a search engine to efficiently rank conceptual schemas retrieved by the search engine in response to a user query, wherein the ranked schemas are ordered by each ranked schema's relative relevancy to one or more concepts comprised by the user query.

The search ranking example is based on a modified application of the methods described in US 2014/0214787 A1 issued as U.S. Pat. No. 8,892,548 B2, the contents of which are incorporated herein by reference. A conceptual query is submitted to a search engine and the result set is made up of objects (web sites, web pages, document, databases, etc.) which are each represented by a specific semantic schema S. US 2014/0214787 A1 discloses a method to rank the results returned by the search engine. US 2014/0214787 A1 considers that if a schema S comprises a concept C and a query Q comprises one single keyword character string that is associated with or is an instance of the concept C, then a rank of the schema S to the query Q is expressed as a function of the semantic value of concept C within schema S. In US 2014/0214787 A1, the computation of the semantic value makes use of a function "Length", which is a length of a link or a chain of links, this being a topological distance. By replacing this "Length" function of US 2014/0214787 A1 by the "informational_distance" of the present invention, a different parameter is calculated that might be referred to as the "information value of concept C within the schema S" (instead of the "semantic value of concept C within the schema S").

Figure 18:
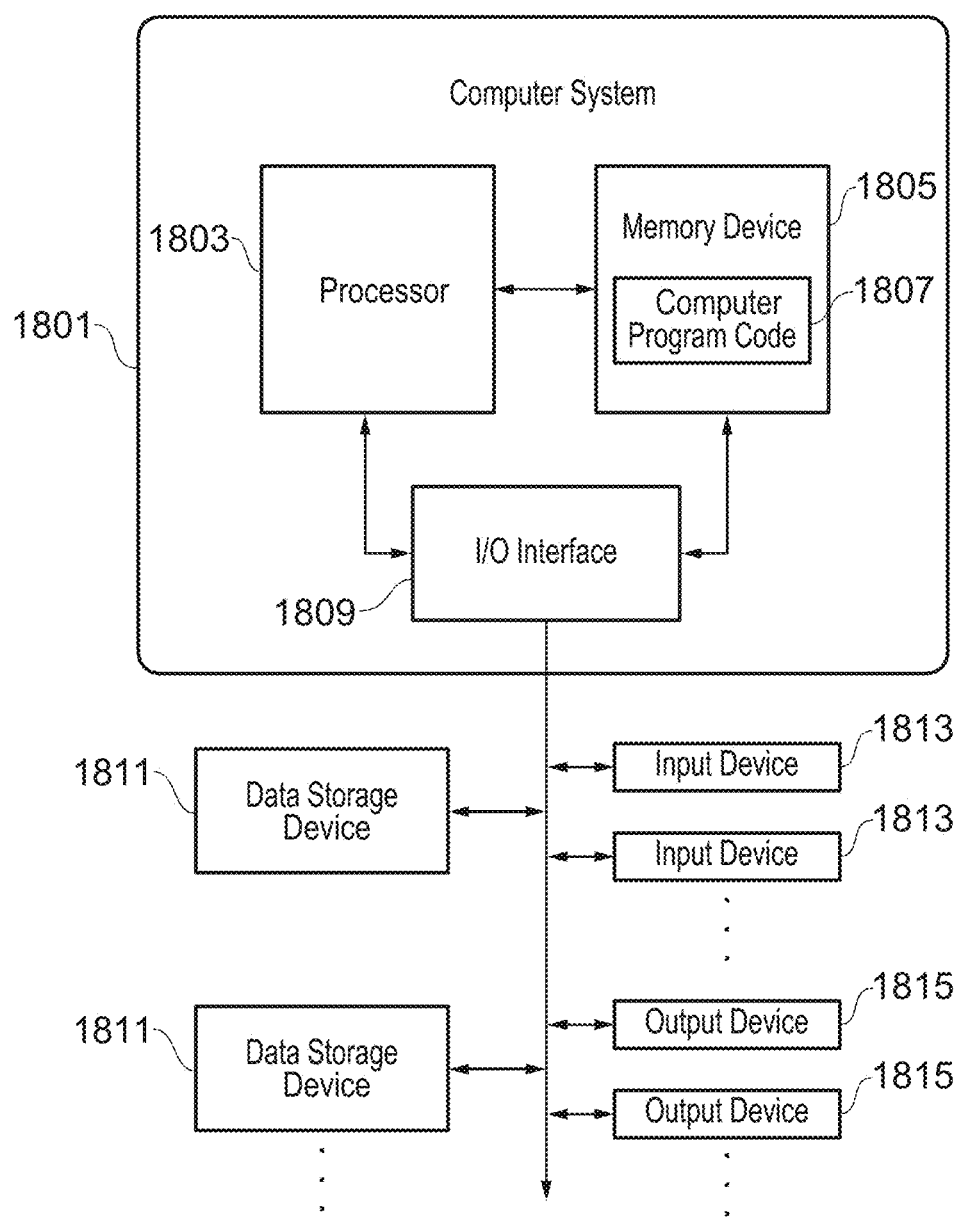
FIG. 18 shows a structure of a computer system and computer program code that may be used to implement a method for ranking answers to a conceptual query in accordance with a first search ranking example, in accordance with embodiments of the present invention.

FIG. 18 shows a structure of a computer system and computer program code that may be used to implement a method for ranking answers to a conceptual query in accordance with a first search ranking example, in accordance with embodiments of the present invention. In FIG. 18, computer system 1801 comprises a processor 1803 coupled through one or more I/O Interfaces 1809 to one or more hardware data storage devices 1811 and one or more I/O devices 1813 and 1815. Processor 1803 may also be connected to one or more memory devices or memories 1805. At least one memory device 1805 contains stored computer program code 1807, which is a computer program that comprises computer-executable instructions. The stored computer program code includes a program that implements a method for the efficient selection of runtime rules for programmable search in accordance with the present example. The data storage devices 1811 may store the computer program code 1807. Computer program code 1807 stored in the storage devices 1811 is configured to be executed by processor 1803 via the memory devices 1805. Processor 1803 executes the stored computer program code 1807.

Memory 1805 may comprise any known computer-readable storage medium, which is described below. In one implementation, cache memory elements of memory 1805 provide temporary storage of at least some program code (e.g., program code 1807) in order to reduce the number of times code needs to be retrieved from bulk storage while instructions of the program code are carried out. Moreover, similar to CPU 1803, memory 1805 may reside at a single physical location, comprising one or more types of data storage, or be distributed across a plurality of physical systems in various forms. Further, memory 1805 can include data distributed across, for example, a local area network (LAN) or a wide area network (WAN).

I/O interface 1809 comprises any system for exchanging information to or from an external source. I/O devices 1813, 1815 comprise any known type of external device, including a display device (e.g., monitor), keyboard, mouse, printer, speakers, handheld device, facsimile, etc. Bus provides a communication link between each of the components in computer system 1801, and may comprise any type of transmission link, including electrical, optical, wireless, etc.

I/O interface 1809 also allows computer system 1801 to store information (e.g., data or program instructions such as program code 1807) on and retrieve the information from computer data storage unit 1811 or another computer data storage unit (not shown). Computer data storage unit 1811 may comprise any known computer-readable storage medium, which is described below. For example, computer data storage unit 1811 may be a non-volatile data storage device, such as a magnetic disk drive (i.e., hard disk drive) or an optical disc drive (e.g., a CD-ROM drive which receives a CD-ROM disk).

Memory 1805 and/or storage unit 1811 may store computer program code 1807 that includes instructions that are carried out by CPU 1803 via memory 1805 to determine a value of an association between ontologies. Although FIG. 18 depicts memory 1805 as including program code 1807, the present disclosure contemplates implementations in which memory 1805 does not include all of code 1807 simultaneously, but instead at any one time includes a portion of code 1807.

Further, memory 1805 may include other systems not shown in FIG. 18, such as an operating system (e.g., Linux®) that runs on CPU 1803 and provides control of various components within and/or connected to computer system 1801. Linux is a registered trademark of Linus Torvalds in the United States, other countries, or both.

Storage unit 1811 and/or one or more other computer data storage units (not shown) that are coupled to computer system 1801 may store ontologies.

An implementation of the present disclosure may take the form of a computer program product embodied in one or more computer-readable storage medium(s) (e.g., memory 1805 and/or computer data storage unit 1811) having computer-readable program code (e.g., program code 1807) embodied or stored thereon.

Any combination of one or more computer-readable mediums (e.g., memory 1805 and computer data storage unit 1811) may be utilized. The computer readable medium may be a computer-readable signal medium or a computer-readable storage medium. In one implementation, the computer-readable storage medium is a computer-readable storage device or computer-readable storage apparatus. Each of the terms computer-readable storage device and computer-readable storage apparatus does not encompass signal propagation media such as copper cables, optical fibers and wireless transmission media. A computer-readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium is a tangible storage device that is not a transitory signal transmission medium and that can contain or store a program (e.g., program code 1807) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1807) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 1807) for carrying out operations for aspects of the present disclosure may be written in any combination of one or more programming languages, including an object-oriented programming language such as Java®, Smalltalk, C++ or the like and conventional procedural programming languages, such as the "C" programming language or similar programming languages. Java is a registered trademark of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 1801 or another computer system (not shown) having components analogous to the components of computer system 1801 included in FIG. 18. In the latter scenario, the remote computer may be connected to the user's computer through any type of network (not shown), including a LAN or a WAN, or the connection may be made to an external computer (e.g., through the Internet using an Internet Service Provider).

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions (e.g., program code 1807). These computer program instructions may be provided to one or more hardware processors (e.g., CPU 1803) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 1805 or computer data storage unit 1811) that can direct a computer (e.g., computer system 1801), other programmable data processing apparatus, or other devices to function in a particular manner, such that the instructions (e.g., program 1807) stored in the computer-readable medium produce an article of manufacture including instructions which implement the function/act specified in the flowcharts and/or block diagram block or blocks.

The computer program instructions may also be loaded onto a computer (e.g., computer system 1801), other programmable data processing apparatus, or other devices to cause a series of operational steps to be performed on the computer, other programmable apparatus, or other devices to produce a computer implemented process such that the instructions (e.g., program 1807) which are carried out on the computer, other programmable apparatus, or other devices provide processes for implementing the functions/acts specified in the flowcharts and/or block diagram block or blocks.

Any of the components of an implementation of the present disclosure can be deployed, managed, serviced, etc. by a service provider that offers to deploy or integrate computing infrastructure with respect to determining a value of an association between ontologies. Thus, an implementation of the present disclosure discloses a process for supporting computer infrastructure, wherein the process comprises a first computer system providing at least one support service for at least one of integrating, hosting, maintaining and deploying computer-readable code (e.g., program code 1807) in a second computer system (e.g., computer system 1801) comprising one or more processors (e.g., CPU 1803), wherein the processor(s) carry out instructions contained in the code causing the second computer system to determine a value of an association between ontologies.

In another implementation, there is provided a method that performs the process steps on a subscription, advertising and/or fee basis. That is, a service provider, such as a Solution Integrator, can offer to create, maintain, support, etc. a process of determining a value of an association between ontologies. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

Figure 19A:
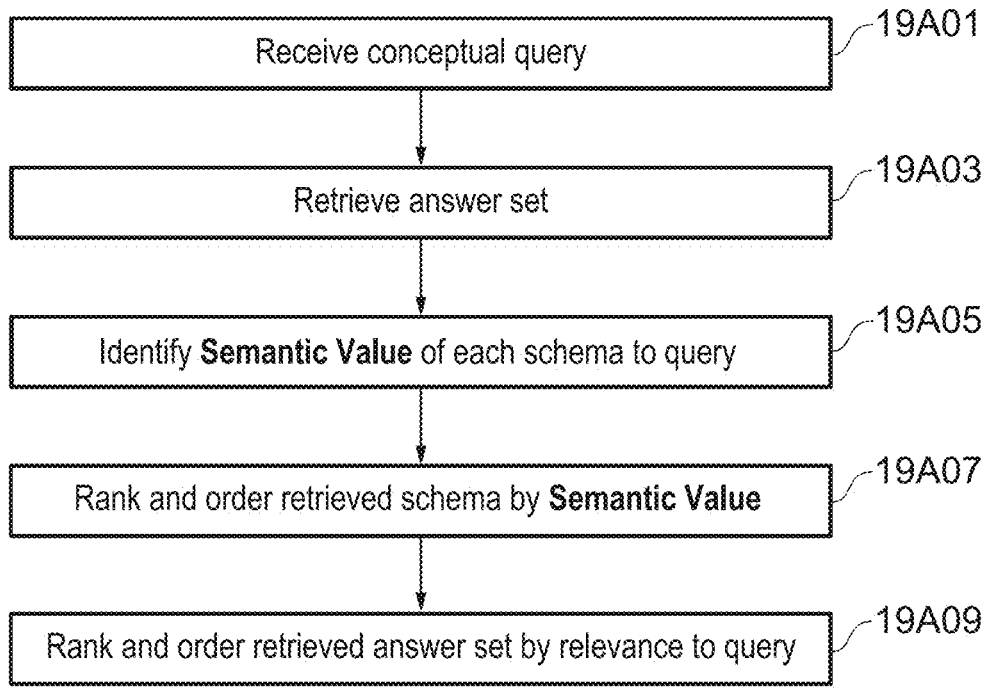
FIG. 19A is a flow chart that overviews a method for ranking answers to a conceptual query in accordance with a first search ranking example, in accordance with embodiments of the present invention.

FIG. 19A is a flow chart that overviews a method for ranking answers to a conceptual query in accordance with a first search ranking example, in accordance with embodiments of the present invention.

In step 19A01, a conceptual search engine receives a conceptual query Q that may comprise a set of queried concepts C(Q). The query Q may be received from querying entity that desires a set of answers that are relevant to the semantic meanings of the queried concepts within the context of the query. In some embodiments, the query will comprise a set of character strings, or keywords, that may be interpreted by the conceptual search engine as concepts or as instances of concepts.

In step 19A03, the search engine retrieves an answer set of information-bearing entities through a method well-known to those skilled in the field of search-engine design, wherein each retrieved entity may comprise or be relevant to a concept comprised by the query. Each retrieved entity may be associated with a semantic schema that may comprise a subset of the set of queried concepts C(Q) and may be further associated with a set of associations among the concepts of the subset of the queried concepts. In some embodiments, the retrieved answer set may comprise a set of retrieved semantic schemas, wherein a schema of the set of retrieved semantic schemas is associated with a retrieved information-bearing entity comprised by the answer set. In some embodiments, the method of FIG. 19A may ignore an information-bearing entity comprised by the retrieved answer set if that entity is not associated with a retrieved semantic schema comprised by the retrieved answer set.

Step 19A05 performs the step of identifying semantic value of each schema to a query once for each semantic schema in the answer set, wherein said each semantic schema in the answer set may have been retrieved in step 19A03, and wherein said each semantic schema comprises a queried concept in the set of concepts C(Q). Step 19A05 may identify a semantic value of the conceptual query Q within each such retrieved semantic schema comprised by the answer set.

Step 19A07 ranks and orders the semantic schemas comprised by the answer set as a function of the schema semantic values identified in step 19A05, wherein each schema semantic value identifies a semantic value and associates that semantic value with one of the ranked and ordered semantic schemas. In embodiments described herein, this ranking and ordering is performed by sorting the schemas by their associated semantic values in descending order. In other embodiments, this ranking and ordering may be performed by alternative or analogous procedures that are based on functions of these associated semantic values identified in step 19A05. In some embodiments, a default procedure may associate a default rank and order with an information-bearing entity retrieved by the procedure of step 19A03, wherein the information-bearing entity is not associated with a retrieved semantic schema.

Step 19A09 ranks and orders the retrieved information-bearing entities comprised by the answer set by their relative relevance to the conceptual query Q. This ranking and ordering may be performed as a function of the sorted order identified in step 19A07 of the set of semantic schemas, wherein a relative relevance of a retrieved information-bearing entity is a function of a relative semantic value of a semantic value of a semantic schema associated with the retrieved information-bearing entity.

The retrieved information-bearing entities are thus ordered by their descending relative relevance to the query Q, wherein an entity's relative relevance to the query Q is a function of a relative semantic value of a semantic schema associated with the entity, and wherein the associated semantic schema was retrieved by step 19A03.

This ordering of step 19A09 results in a sorted order of information-bearing entities that is analogous to the sorted order of step 19A07 of the set of schemas associated with the entities. In other embodiments, this ordering of step 19A09 may be performed by alternative or analogous procedures that are based on functions of the semantic values identified in step 19A05.

Figure 20:
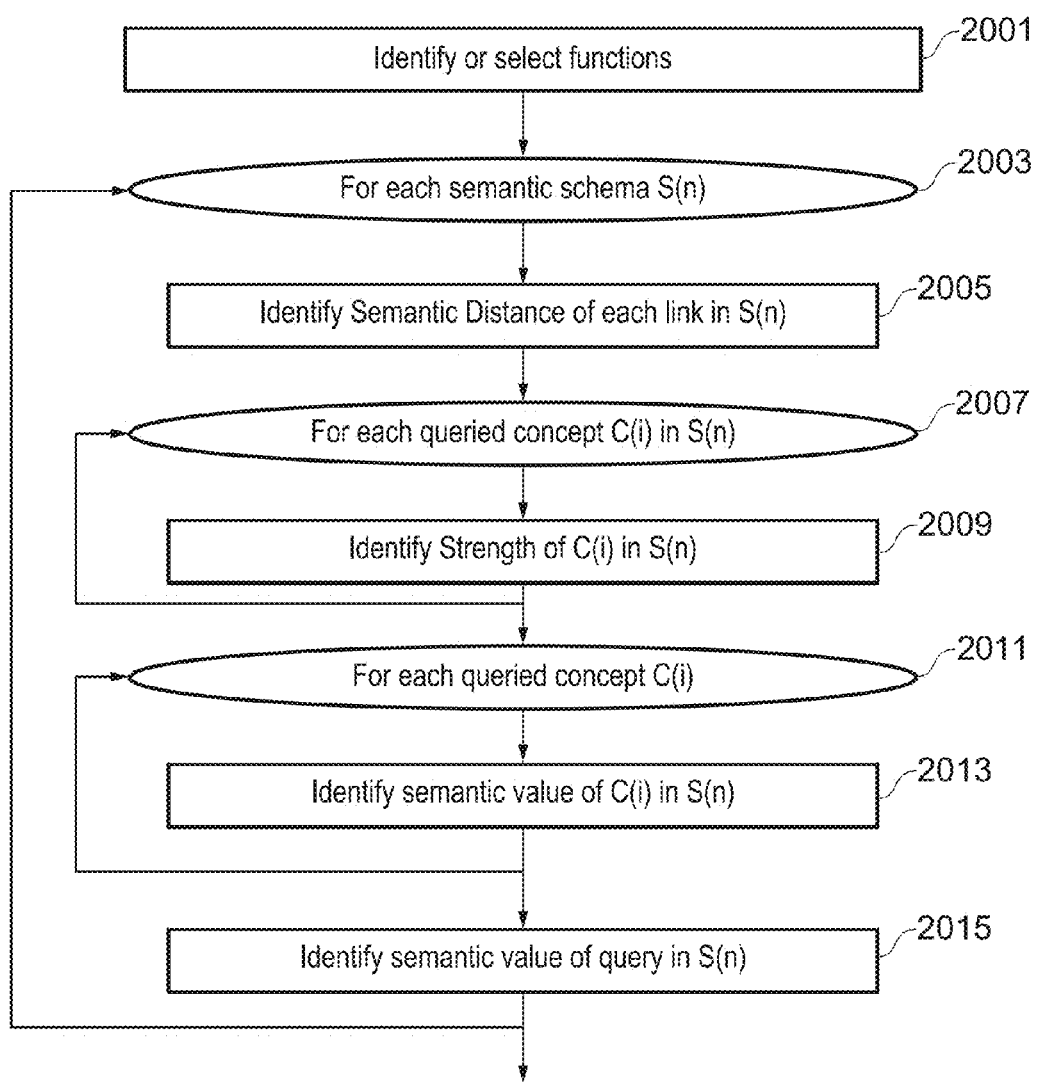
FIG. 20 is a flow chart that presents further details of the process flow of the first search ranking example of FIG. 19A, in accordance with embodiments of the present invention.

FIG. 20 is a flow chart that presents further details of the process flow of the first search ranking example of FIG. 19A, in accordance with embodiments of the present invention. The flow chart of FIG. 20 presents further details of the procedure of step 19A05 of FIG. 19A.

In step 2001, the present search ranking example may select a set of functions that may comprise components of a method to identify a semantic value of a queried concept in a semantic schema.

Step 2003 initiates an iterative procedure that comprises steps 2003-2015 and that performs one iteration for each semantic schema S(n) of the answer set of semantic schemas retrieved in step 19A03. Upon completion of this iterative procedure for all such semantic schemas in the answer set, the method of FIG. 20 terminates and the process flow continues with step 19A07 of FIG. 19A.

Step 2005 calculates semantic distance of each link in S(n), wherein said each link identifies an association between a pair of concepts comprised by the schema S(n).

Step 2007 initiates an iterative procedure that comprises steps 2007-2009 and that may perform one iteration for each concept C(j) comprised by schema S(n). In some embodiments, an iteration of steps 2007-2009 may not be performed for a concept that is not comprised by query Q. Upon completion of the iterative procedure of steps 2007-2009 for all concepts C(j) that meet one of these sets of criteria, or that meet analogous, implementation-dependent, sets of criteria, the iterative procedure of steps 2007-2009 terminates and the method of FIG. 20 continues with step 2011.

Step 2009 employs one or more strength functions selected in step 2001 to identify Str(C(j),S(n)), a strength of the concept C(j) in the schema S(n). Upon completion of the iterative procedure of steps 2007-2009 for all concepts C(j) in S(n) that meet the set of criteria identified by step 2007, the method will have identified a strength Str(C(j),S(n)) for every such concept C(j), the iterative procedure of steps 2007-2009 will terminate, and the method of FIG. 20 will continue with step 2011.

Step 2011 initiates an iterative procedure that comprises steps 2011-2013 and that may perform one iteration for each queried concept C(i)∈C(Q), wherein the conceptual query Q of step 19A01 comprises the set of queried concepts C(Q). In some embodiments, an iteration of steps 2011-2013 may be performed for a queried concept C(i) only if C(i) is comprised by both C(Q) and by semantic schema S(n). Upon completion of the iterative procedure of steps 2011-2013 for all queried concepts C(i) that meet one of these sets of criteria, or that meet analogous, implementation-dependent, sets of criteria, the iterative procedure of steps 2011-2013 terminates and the method of FIG. 20 continues with step 2015.

Step 2013 employs one or more semantic value functions selected in step 2001 to identify SV(C(i),S(n)), a semantic value of the queried concept C(i) in the schema S(n). In some embodiments, SV(C(i),S(n)) may return a null or other void or constant value if S(n) does not comprise C(i).

Figure 21:
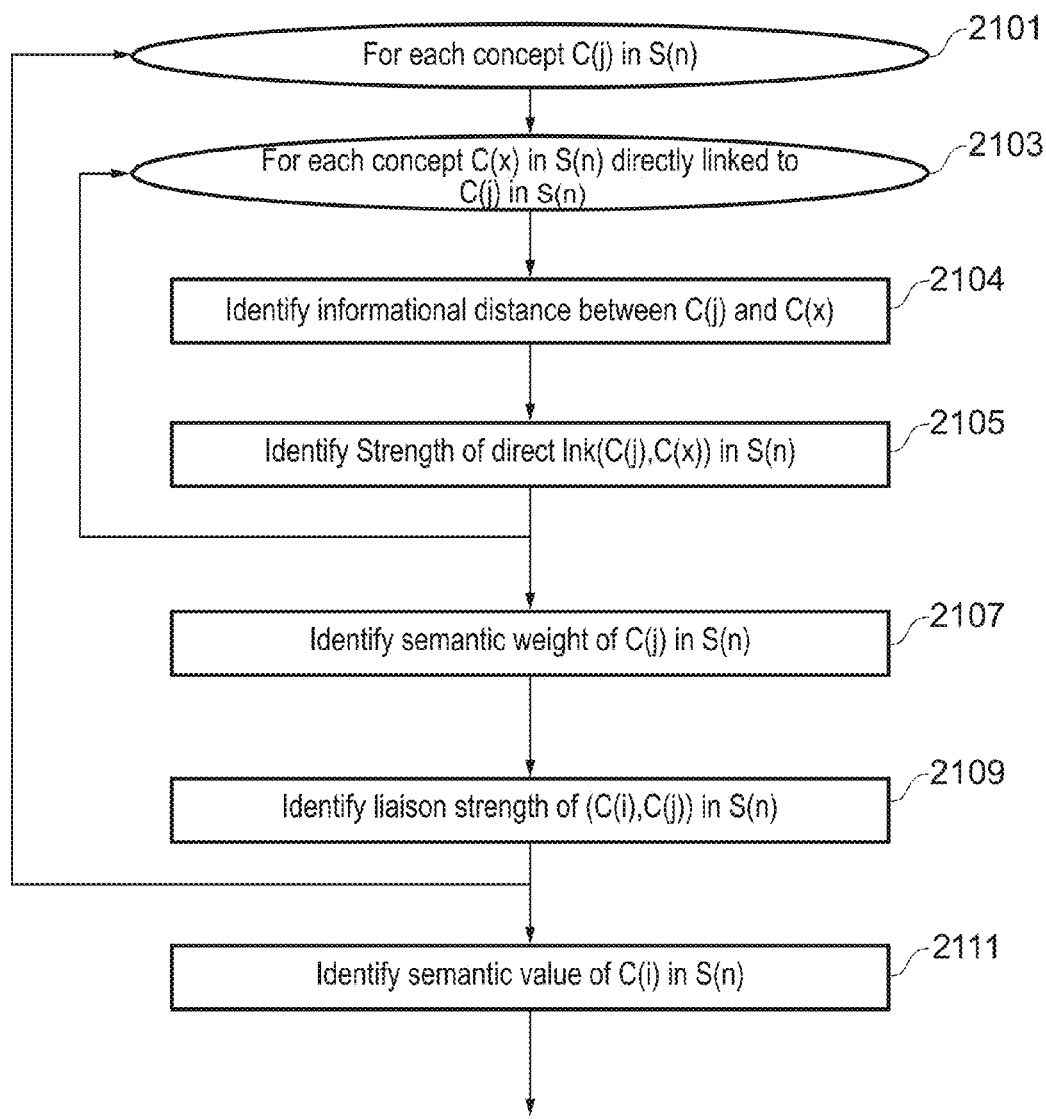
FIG. 21 is a flow chart that presents further details of the process flow of the first search ranking example of FIG. 20.

Step 2013 is described in greater detail in FIG. 21.

Upon completion of the iterative procedure of steps 2011-2013 for all queried concepts C(i) that meet a set of criteria identified by step 2011, the method of FIG. 20 will have identified a semantic value SV(C(i),S(n)) for every such concept C(i), the iterative procedure of steps 2011-2013 will terminate, and the method of FIG. 20 will continue with step 2015.

Step 2015 identifies a value of SV(Q,S(n)), a semantic value of the conceptual query Q of step 19A01 within schema S(n).

At the completion of step 2015, if the iterative procedure of steps 2003-2015 has not been performed for all semantic schema S(n), the method of FIG. 20 will return to step 2003 to begin the next iteration of the iterative procedure of steps 2003-2015 for a next semantic schema S(n). If the iterative procedure of steps 2003-2015 has been performed for all semantic schema S(n), the method will continue with step 19A07 of FIG. 19A, returning a semantic value of query Q within each schema S(n) retrieved by step 19A03.

FIG. 21 is a flow chart that presents further details of the process flow of the first search ranking example of FIG. 20. The flow chart of FIG. 21 illustrates details of a procedure of step 2013 of FIG. 20 for identifying a semantic value of a queried concept C(i) within a semantic schema S(n), wherein C(i) is comprised by a set of queried concepts C(Q) that is in turn comprised by a conceptual query Q, and wherein, in response to the query Q, S(n) is retrieved by a search engine in step 19A03. In some embodiments, the method of FIG. 21 may be performed once for each queried concept C(i) comprised by the query Q. In other embodiments, the method of FIG. 21 may be performed once for each queried concept C(i) that is comprised by both C(Q) and by the semantic schema S(n).

Step 2101 initiates an iterative procedure that comprises steps 2101-2109 and that is performed for each concept C(j) that is comprised by schema S(n). Upon completion of this iterative procedure for all such concepts C(j), the iterative procedure of steps 2101-2109 terminates and the method of FIG. 21 continues with step 2111.

Step 2103 initiates an iterative process that comprises steps 2103-2105 and that is performed once for each concept C(x) that is comprised by schema S(n), wherein C(x) is connected by a single direct link to the concept C(j). In some embodiments, concept C(j) may be deemed to be connected to itself by a single direct link. Upon completion of this iterative process of steps 2103-2105 for all concepts C(x), the iterative process of steps 2103-2105 terminates and the method of FIG. 21 continues with step 2107.

Step 2104 is a step to identify for each concept C(j) of S(n), the informational distance between C(j) and its directly linked concepts C(x). The informational distances are used (instead of the lengths of the links as used in US 2014/0214787 A1) to compute the Strength of direct lnk(C(j),C(x)) according to the equation:

$$Str(lnk(C(x),C(j)))=1/[1+informational\_distance(C(j),C(x))]$$

where the informational distance is computed along the direct link between C(j) and C(x). Compared with US 2014/0214787 A1, the present invention is using here a function "Length" that is the above-described "Informational_distance". It is noted that step 2104 is an additional step compared with the steps of the method of FIG. 4 of US 2014/0214787 A1 which is inserted between Step 403 and Step 405 of FIG. 4 of US 2014/0214787 A1.

Step 2105 identifies Str(lnk(C(j),C(x)),S(n)), a strength of a direct link lnk(C(j),C(x)) within schema S(n), wherein the direct link lnk(C(j),C(x)) directly connects concept C(j) within schema S(n) to concept C(x) within schema S(n).

Upon completion of step 2105, the iterative process of steps 2103-2105 begins its next iteration for the next instance of concept C(x). Upon completion of the iterative process of steps 2103-2105 for all concepts C(x) directly linked in schema S(n) to concept C(j), the iterative process of steps 2103-2105 terminates and the method of FIG. 21 continues with step 2107.

Step 2107 uses the results of steps 2105 and 2009 to identify a semantic weight of the concept C(j) in the schema S(n). An identification of a semantic weight function to be used in step 2107 may be implementation-dependent, and an identification of which semantic weight function to use in a particular embodiment of the present invention may be made in step 2001.

Step 2109 identifies an LStr(C(i), C(j), S(n)), a liaison strength between C(i) and C(j) within schema S(n), wherein C(i) is a concept in S(n) identified in steps 2011-2013 of FIG. 20, and C(j) is a concept in S(n) identified in step 2101 of FIG. 21. In Step 2109, "Informational_distance" is used as Length. Namely, Liasion_Strength(C(i), C(j)) measures the strength of the liaison between C(i) and C(j) as the maximum strength among all chains linking C(i) and C(j) in the schema S according to the relations:

$$Liaison\_Strength(C(i),C(j))=MAX_{chain}(Strength_{chain}(C(i),C(j)))$$

where $$Strength_{chain}(C(i),C(j))=1/[1+informational\_distance(C(i),C(j))]$$

Upon completion of step 2109, the next iteration of the iterative process of steps 2101-2109 begins with step 2101, for the next instance of concept C(j) within S(n). Upon completion of the iterative process of steps 2101-2109 for all concepts C(j) within S(n), the iterative process of steps 2101-2109 concludes and the method of FIG. 21 continues with step 2111.

Step 2111 uses the results of steps 2107 and 2109 to identify a semantic value of queried concept C(i) within semantic schema S(n). Step 2111 may be performed through application of one or more semantic value functions that identify a semantic value of a concept within a schema.

Upon completion of step 2111, the method of FIG. 21 concludes, and the method continues with the next iteration of the iterative procedure of steps 2011 and 2013 of FIG. 20. If the iterative procedure of steps 2011 and 2013 has been performed for all queried concepts C(i), as defined in the description of steps 20211-2013, then the method continues with step 2015 of FIG. 20.

A second search ranking example is now described based on a modified application of the methods described in US 2014/0214787 A1 issued as U.S. Pat. No. 8,892,548 B2, the contents of which are incorporated herein by reference. The second search ranking example is the same as the first search ranking example in respect of the hardware platform of FIG. 18.

Figure 19B:
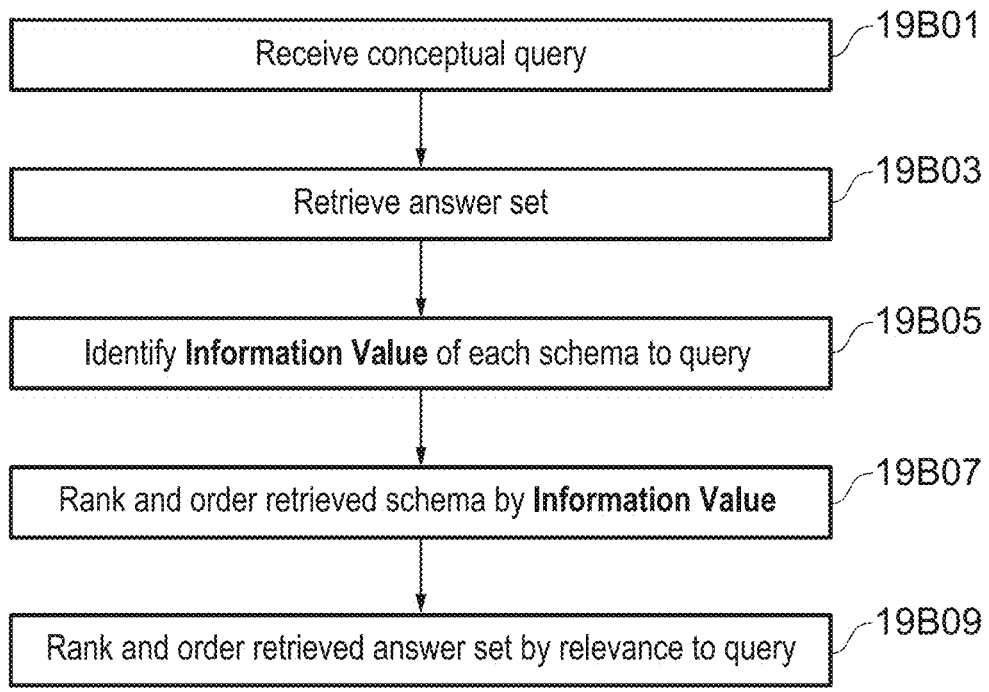
FIG. 19B is a flow chart that overviews a method for ranking answers to a conceptual query in accordance with a second search ranking example, in accordance with embodiments of the present invention.

The second search ranking example differs very slightly from the high level process flow of FIG. 19A, in that it refers to the "Information Value" instead of the "Semantic Value", so that FIG. 19B is presented that replaces FIG. 19A. FIG. 19B is a flow chart that overviews a method for ranking answers to a conceptual query in accordance with the second search ranking example, in accordance with embodiments of the present invention.

Figure 22:
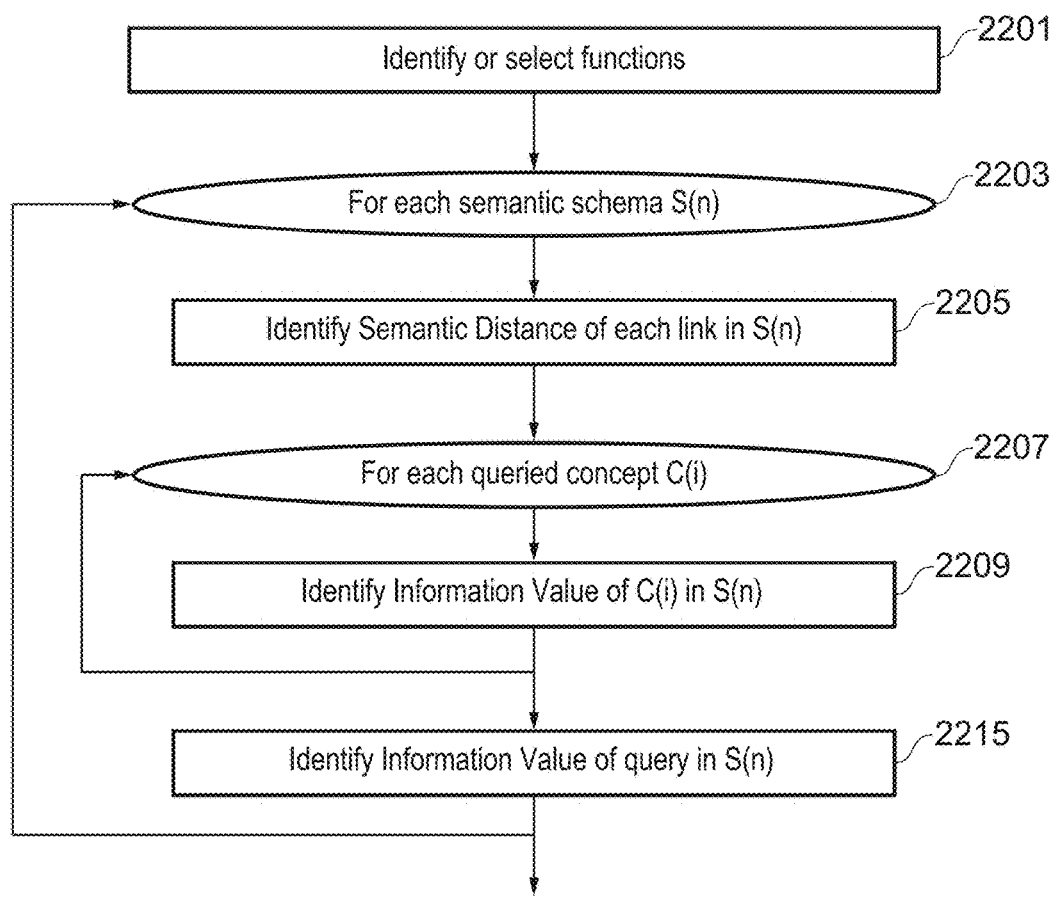
FIG. 22 is a flow chart that presents further details of the process flow of the second search ranking example of FIG. 19B, in accordance with embodiments of the present invention.
Figure 23:
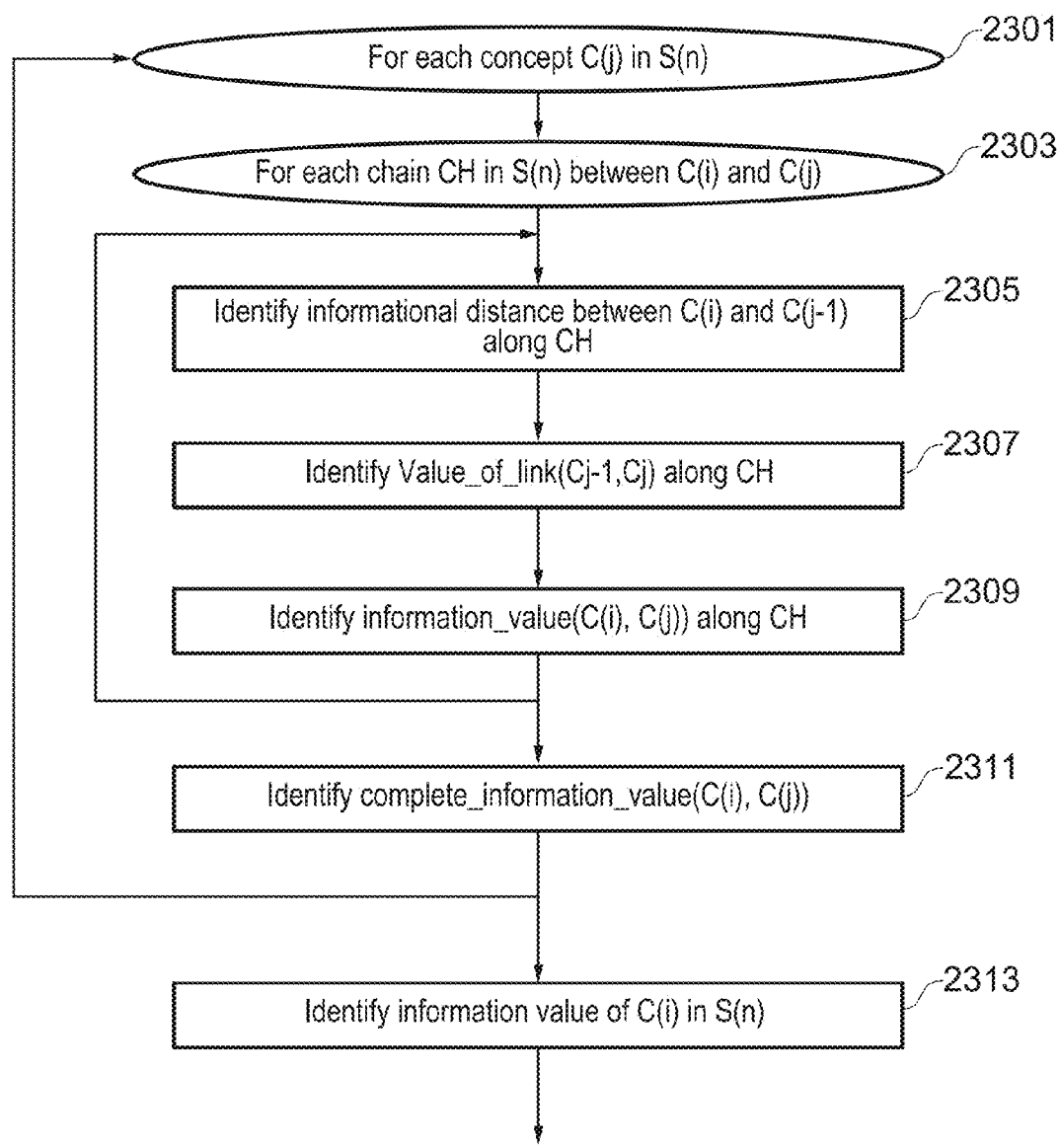
FIG. 23 is a flow chart that presents further details of the process flow of the second search ranking example of FIG. 22, in accordance with embodiments of the present invention.

The second search ranking example differs further from the first search ranking example in respect of the lower level processes, so that a further FIG. 22 and a further FIG. 23 are presented which replace FIG. 20 and FIG. 21 of the first search ranking example respectively.

The second search ranking example uses directly the "information_value" to replace the "semantic value" of US 2014/0214787 A1. That is to say, instead of using:

$$SV(C,S) = \Sigma_{i:1 \ldots n}[SW(Ci,S) * \text{Liaison\_Strength}(C,Ci)]$$

where {Ci} is the set of all concepts in the schema S, the second search ranking example uses:

$$IV(C,S) = \Sigma_{i:1 \ldots n}[\text{complete\_information\_value}(C,Ci)]$$

where "IV(C,S)" stands for "information_value of the concept C in the schema S",
where {Ci} is the set of all concepts in the schema S, and
where "complete_information_value(C,Ci)" is a function of the different "information_value(C,Ci)" along the different chains that join C and Ci.

As complete_information_value(C,Ci), the following could be used:
MAX [information_value(C,Ci)], i.e. the maximum value of "information_value(C,Ci)", wherein each information_value(C,Ci) is computed on a different chain. This is just an example; instead of MAX, the sum of the different "information_value(C,Ci)" along the different chains between C and Ci could be used.

Moreover, in place of the following semantic value formula used in US 2014/0214787 A1:

$$SV(Q,S) = \Sigma_{i:1 \ldots n}[SV(Ci,S)]$$

where Ci are the concepts listed in the query Q, we use:

$$IV(Q,S) = \Sigma_{i:1 \ldots n}[IV(Ci,S)]$$

where Ci are the concepts listed in the query Q, and
where IV(Q,S) stands for "information_value of the query Q in the schema S".

FIG. 22 is a flow chart that presents further details of the process flow of the second search ranking example of FIG. 19B, in accordance with embodiments of the present invention. The flow chart of FIG. 22 presents further details of the procedure of step 19B05 of FIG. 19B for the second search ranking example.

In step 2201, the second search ranking example may select a set of functions that may comprise components of a method to identify an information value of a queried concept in a semantic schema.

Step 2203 initiates an iterative procedure that comprises steps 2203-2215 and that performs one iteration for each semantic schema S(n) of the answer set of semantic schemas retrieved in step 19B03 of FIG. 19B. Upon completion of this iterative procedure for all such semantic schemas in the answer set, the method of FIG. 22 terminates and the process flow continues with step 19B07 of FIG. 19B.

Step 2205 calculates semantic distance of each link in S(n), wherein each link identifies an association between a pair of concepts comprised by the schema S(n).

Step 2207 initiates an iterative procedure that comprises steps 2207-2209 and that may perform one iteration for each concept C(j) comprised by schema S(n). In some embodiments, an iteration of steps 2207-2209 may not be performed for a concept that is not comprised by query Q. Upon completion of the iterative procedure of steps 2207-2209 for all concepts C(j) that meet one of these sets of criteria, or that meet analogous, implementation-dependent, sets of criteria, the iterative procedure of steps 2207-2209 terminates and the method of FIG. 22 continues with step 2215.

Step 2209 employs one or more "information value" functions selected in step 2201 to identify Information Value of the concept C(j) in the schema S(n). Upon completion of the iterative procedure of steps 2207-2209 for all concepts C(j) in S(n) that meet the set of criteria identified by step 2207, the method will have identified a Information Value for every such concept C(j), the iterative procedure of steps 2207-2209 will terminate, and the method of FIG. 22 will continue with step 2215.

Step 2215 identifies a value of IV(Q,S(n)), an information value of the conceptual query Q of step 19B01 within schema S(n).

At the completion of step 2215, if the iterative procedure of steps 2203-2215 has not been performed for all semantic schema S(n), the method of FIG. 22 will return to step 2203 to begin the next iteration of the iterative procedure of step 2203-2215 for a next semantic schema S(n). If the iterative procedure of steps 2203-2215 has been performed for all semantic schema S(n), the method will continue with step 19B07 of FIG. 19B, returning a information value of query Q within each schema S(n) retrieved by step 19B03.

FIG. 23 is a flow chart that presents further details of the process flow of the second search ranking example of FIG. 22, in accordance with embodiments of the present invention. The flow chart of FIG. 23 illustrates details of a procedure of step 2209 of FIG. 22 for identifying an information value of a queried concept C(i) within a semantic schema S(n), wherein C(i) is comprised by a set of queried concepts C(Q) that is in turn comprised by a conceptual query Q, and wherein, in response to the query Q, S(n) is retrieved by a search engine in step 19B03. In some embodiments, the method of FIG. 23 may be performed once for each queried concept C(i) comprised by the query Q. In other embodiments, the method of FIG. 23 may be performed once for each queried concept C(i) that is comprised by both C(Q) and by the semantic schema S(n).

Step 2301 initiates an iterative procedure that comprises steps 2301-2311 and that is performed for each concept C(j) that is comprised by schema S(n). Upon completion of this iterative procedure for all such concepts C(j), the iterative procedure of steps 2301-2311 terminates and the method of FIG. 23 continues with step 2313.

Step 2303 indicates the commencement of an iterative procedure to be carried out for each chain CH in S(n) between C(i) and C(j).

Step 2305 identifies the informational distance between C(i) and C(j−1) along CH.

Step 2307 identifies Value_of_link(Cj−1,Cj) along CH.

Step 2309 identifies information_value(C(i), C(j)) along CH.

Step 2311 identifies complete_information_value(C(i), C(j)).

Step 2313 identifies information value of C(i) in S(n). Upon completion of step 2313, the method of FIG. 23 concludes, and the method continues with step 2215 of FIG. 22.

The above-described method is applicable to: assessing the interest of merging ontologies (sometimes called conceptual schemas) to create value; and evaluating the information richness of ontologies (e.g. to order search results). Specifically, in the case of merging ontologies, the method described herein can be used to improve the method of U.S. Pat. No. 8,799,330 B2 ("Determining the value of an association between ontologies") and, in the case of ordering search results, the method described herein can be used to improve the method of U.S. Pat. No. 8,892,548 B2 ("Ordering search-engine results").

Figure 24:
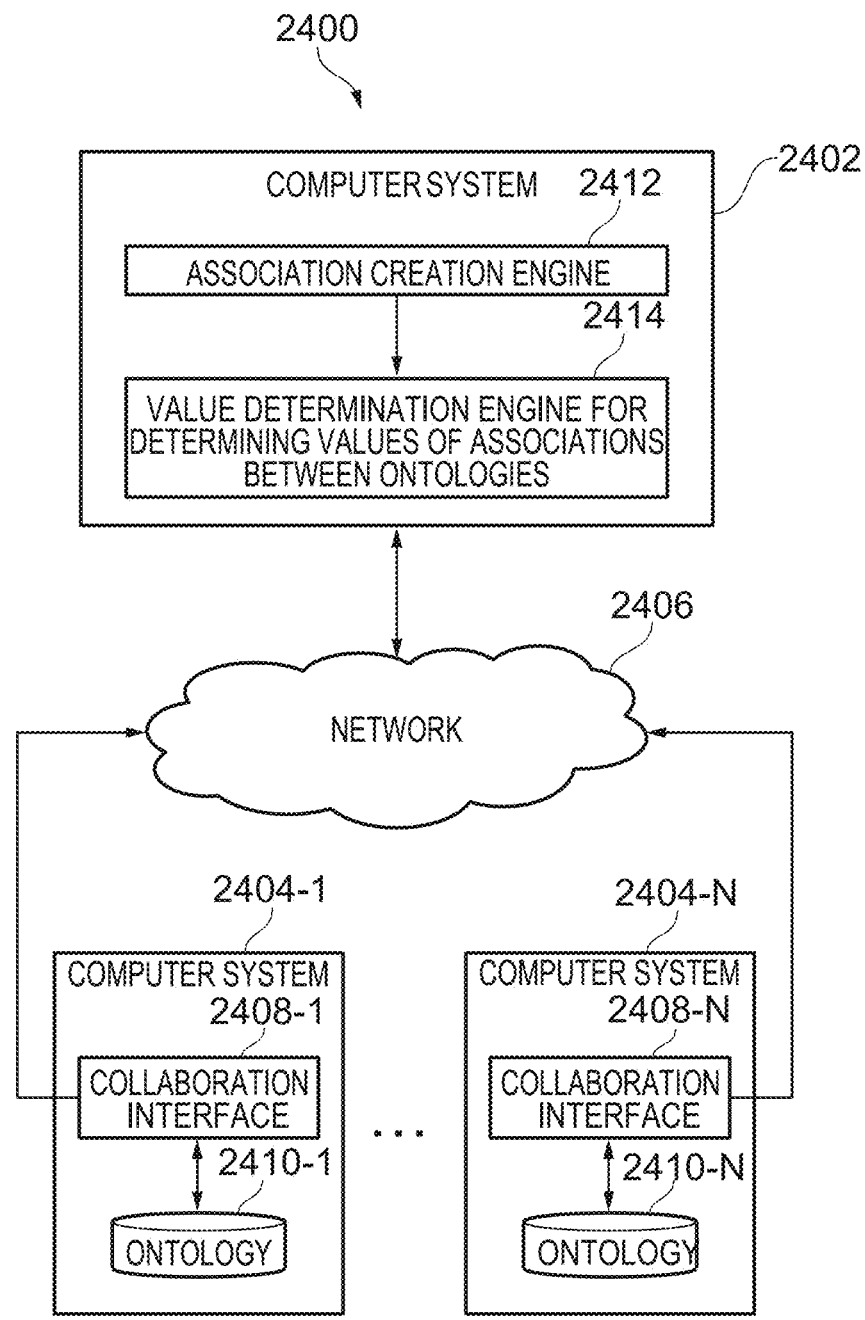
FIG. 24 is a block diagram of a system for merging cross-domain ontologies which comprises multiple computer systems, in accordance with embodiments of the present invention.

FIG. 24 is a block diagram of a system for merging cross-domain ontologies which comprises multiple computer systems, in accordance with embodiments of the present invention. The flow chart of FIG. 24 is a block diagram of a system for merging cross-domain ontologies using information values computed by the methods described herein. System 2400 includes a computer system 2402 in communication with computer systems 2004-1 . . . 2004-N via a computer network 2406, where N is an integer and N>1.

Computer systems 2004-1 . . . 2004-N run software-based collaboration interfaces 2408-1 . . . 2408-N, respectively, and include ontologies 2410-1 . . . 2410-N respectively. In one implementation, computer network 2406 provides a collaboration network among users, where each ontology of ontologies 2410-1 . . . 2410-N describes a universe of discourse of a corresponding user of the collaboration network, and where the users may utilize collaboration interfaces 2408-1 . . . 2408-N to share the ontologies 2410-1 . . . 2410-N via network 2406.

The ontology schemas (not shown) underlying respective ontologies 2410-1 . . . 2410-N may be aligned and each user who wants to benefit from the semantic capabilities of network 2406 uses the same schema builder (not shown) to build the ontology schemas (e.g., using the same method and reference ontology as described in U.S. Pat. No. 8,747,115 ("BUILDING AN ONTOLOGY BY TRANSFORMING COMPLEX TRIPLES") the contents of which is incorporated herein in its entirety by reference.

Ontologies 2410-1 . . . 2410-N may be specified respectively by N different ontology schemas, or two or more ontologies in ontologies 2410-1 . . . 2410-N may by specified by the same ontology schemas.

A collaboration network provided by network 2406 may be specialized or non-specialized. For example, a specialized collaboration network may be a network of inventors who want to share their knowledge and questions in order to find innovative solutions to challenges, as described in U.S. Pat. No. 8,793,208 ("IDENTIFYING COMMON DATA OBJECTS REPRESENTING SOLUTIONS TO A PROBLEM IN DIFFERENT DISCIPLINES") the contents of which is incorporated herein in its entirety by reference As another example, the collaboration network may be a network of people collaborating in a project, a game, a social network, etc., where the people in the network want to discover possible associations between their universes of discourse or centers of interest. As an example of a non-specialized network, the network may be the World Wide Web itself, specifically the Semantic Web.

Computer system 2402 runs a software-based association creation engine 2412, which merges (i.e., associates) ontologies included in ontologies 2410-1 . . . 2410-N. In one implementation, ontologies merged by association creation engine 2412 enrich a collaboration provided by network 2406. Computer system 2402 also runs a value determination engine 2414 for determining values of associations between ontologies, where the associations are created by association creation engine 2412. The values determined by value determination engine 2414 allow the collaboration networks provided by network 2406 to save time by not considering a merge between ontologies where the merge has no value. In one implementation, computer system 2402 ranks associations between ontologies based on the values determined by value determination engine 2414. The ranked associations may allow end users in a collaboration network to efficiently utilize their time by focusing only on the merges that have the highest ranks.

Figure 25:
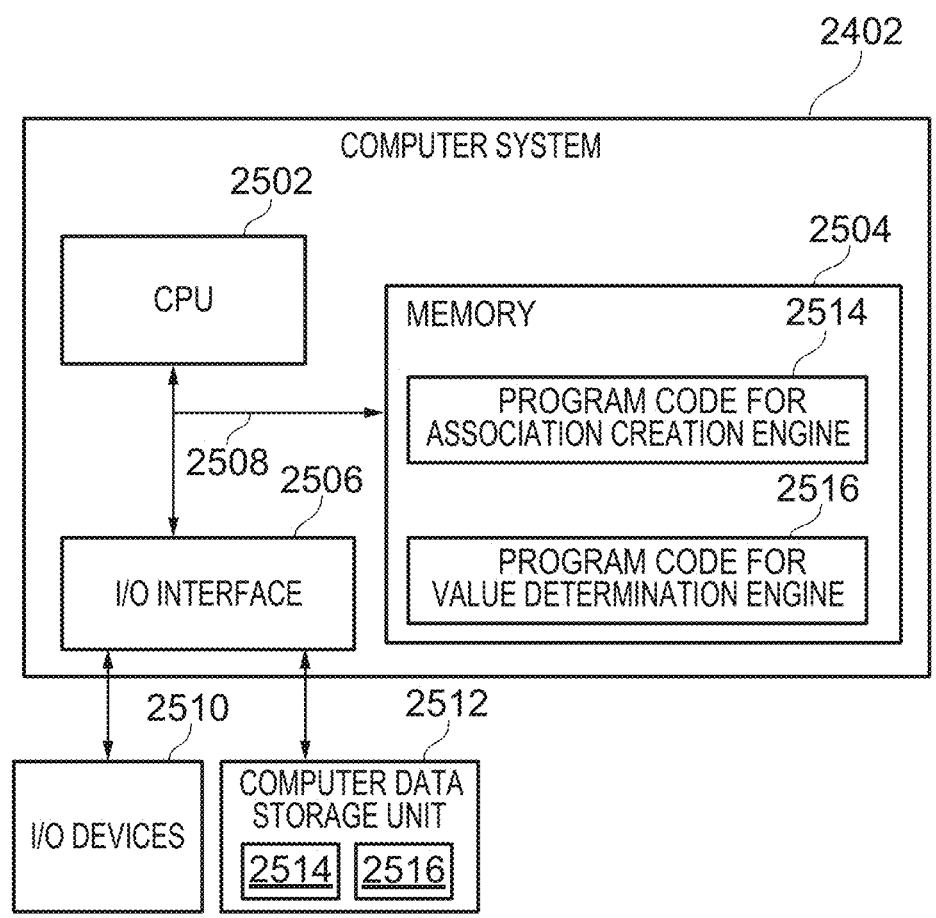
FIG. 25 is a computer system as used in FIG. 24 for merging cross-domain ontologies, in accordance with embodiments of the present invention.

FIG. 25 is a computer system as used in FIG. 24 for merging cross-domain ontologies, in accordance with embodiments of the present invention. The computer system in FIG. 25 is included in the system of FIG. 24 and implements the processes described herein for merging cross-domain ontologies using information values computed by the methods described herein. Computer system 2402 generally comprises a central processing unit (CPU) 2502, a memory 2504, an input/output (I/O) interface 2506, and a bus 2508. Further, computer system 2402 is coupled to I/O devices 2510 and a computer data storage unit 2512. CPU 2502 performs computation and control functions of computer system 2402, including carrying out instructions included in program code 2514 and program code 2516 to perform a method of determining a value of an association between ontologies, where the instructions are carried out by CPU 2502 via memory 2504. CPU 2502 may comprise a single processing unit, or be distributed across one or more processing units in one or more locations (e.g., on a client and server). In one implementation, program code 2514 includes code for association creation engine 2412 (see FIG. 24) and program code 2516 includes code for value determination engine 2414 (see FIG. 24).

Memory 2504 may comprise any known computer-readable storage medium, which is described below. In one implementation, cache memory elements of memory 2504 provide temporary storage of at least some program code (e.g., program code 2514 and/or program code 2516) in order to reduce the number of times code needs to be retrieved from bulk storage while instructions of the program code are carried out. Moreover, similar to CPU 2502, memory 2504 may reside at a single physical location, comprising one or more types of data storage, or be distributed across a plurality of physical systems in various forms. Further, memory 2504 can include data distributed across, for example, a local area network (LAN) or a wide area network (WAN).

I/O interface 2506 comprises any system for exchanging information to or from an external source. I/O devices 2510 comprise any known type of external device, including a display device (e.g., monitor), keyboard, mouse, printer, speakers, handheld device, facsimile, etc. Bus 2508 provides a communication link between each of the components in computer system 2402, and may comprise any type of transmission link, including electrical, optical, wireless, etc.

I/O interface 2506 also allows computer system 2402 to store information (e.g., data or program instructions such as program code 2514 and program code 2516) on and retrieve the information from computer data storage unit 2512 or another computer data storage unit (not shown). Computer data storage unit 2512 may comprise any known computer-readable storage medium, which is described below. For example, computer data storage unit 2512 may be a non-volatile data storage device, such as a magnetic disk drive (i.e., hard disk drive) or an optical disc drive (e.g., a CD-ROM drive which receives a CD-ROM disk).

Memory 2504 and/or storage unit 2512 may store computer program code 2514 and program code 2516 that includes instructions that are carried out by CPU 2502 via memory 2504 to determine a value of an association between ontologies. Although FIG. 25 depicts memory 2504 as including program code 2514 and program code 2516, the present disclosure contemplates implementations in which memory 2504 does not include all of code 2514 and code 2516 simultaneously, but instead at one time includes a portion of code 2514 and/or a portion of code 2516.

Further, memory 2504 may include other systems not shown in FIG. 25, such as an operating system (e.g., Linux®) that runs on CPU 2502 and provides control of various components within and/or connected to computer system 2402. Linux is a registered trademark of Linus Torvalds in the United States, other countries, or both.

Storage unit 2512 and/or one or more other computer data storage units (not shown) that are coupled to computer system 2402 may store ontologies 2410-1 . . . 2410-N.

An implementation of the present disclosure may take the form of a computer program product embodied in one or more computer-readable storage medium(s) (e.g., memory 2504 and/or computer data storage unit 2512) having computer-readable program code (e.g., program code 2514 and program code 2516) embodied or stored thereon.

Any combination of one or more computer-readable mediums (e.g., memory 2504 and computer data storage unit 2512) may be utilized. The computer readable medium may be a computer-readable signal medium or a computer-readable storage medium. In one implementation, the computer-readable storage medium is a computer-readable storage device or computer-readable storage apparatus. Each of the terms computer-readable storage device and computer-readable storage apparatus does not encompass signal propagation media such as copper cables, optical fibers and wireless transmission media. A computer-readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium is a tangible storage device that is not a transitory signal transmission medium and that can contain or store a program (e.g., program code 2514 or program code 2516) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 2514 and 2516) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 2514 and 2516) for carrying out operations for aspects of the present disclosure may be written in any combination of one or more programming languages, including an object-oriented programming language such as Java®, Smalltalk, C++ or the like and conventional procedural programming languages, such as the "C" programming language or similar programming languages. Java is a registered trademark of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 2402 or another computer system (not shown) having components analogous to the components of computer system 2402 included in FIG. 25. In the latter scenario, the remote computer may be connected to the user's computer through any type of network (not shown), including a LAN or a WAN, or the connection may be made to an external computer (e.g., through the Internet using an Internet Service Provider).

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions (e.g., program code 2514 and 2516). These computer program instructions may be provided to one or more hardware processors (e.g., CPU 2502) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 2504 or computer data storage unit 2512) that can direct a computer (e.g., computer system 2402), other programmable data processing apparatus, or other devices to function in a particular manner, such that the instructions (e.g., program 2514 and program 2516) stored in the computer-readable medium produce an article of manufacture including instructions which implement the function/act specified in the flowcharts and/or block diagram block or blocks.

The computer program instructions may also be loaded onto a computer (e.g., computer system 2402), other programmable data processing apparatus, or other devices to cause a series of operational steps to be performed on the computer, other programmable apparatus, or other devices to produce a computer implemented process such that the instructions (e.g., program 2514 and program 2516) which are carried out on the computer, other programmable apparatus, or other devices provide processes for implementing the functions/acts specified in the flowcharts and/or block diagram block or blocks.

Any of the components of an implementation of the present disclosure can be deployed, managed, serviced, etc. by a service provider that offers to deploy or integrate computing infrastructure with respect to determining a value of an association between ontologies. Thus, an implementation of the present disclosure discloses a process for supporting computer infrastructure, wherein the process comprises a first computer system providing at least one support service for at least one of integrating, hosting, maintaining and deploying computer-readable code (e.g., program code 2514 and program code 2516) in a second computer system (e.g., computer system 2402) comprising one or more processors (e.g., CPU 2502), wherein the processor(s) carry out instructions contained in the code causing the second computer system to determine a value of an association between ontologies.

In another implementation, there is provided a method that performs the process steps on a subscription, advertising and/or fee basis. That is, a service provider, such as a Solution Integrator, can offer to create, maintain, support, etc. a process of determining a value of an association between ontologies. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

When two ontologies are merged (i.e., the ontology schemas underlying the ontologies are merged), new relationships (i.e., new semantics) are formed, which can be sources of innovations when the merged ontology schemas are from different knowledge domains. In the following, two examples are described for determining a value of an association or merge between two ontology schemas. The ontology merging examples apply the above described embodiments of the present invention to the method described in US 2014/0052759 A1, which was issued as U.S. Pat. No. 8,799,330 B2, the contents of which are incorporated herein by reference. In short, we propose to substitute "information_distance" and "information_value" in several of the formulae proposed in US 2014/0052759 A1 in order to allow computing an information value of a bridge between two schemas.

Figure 26:
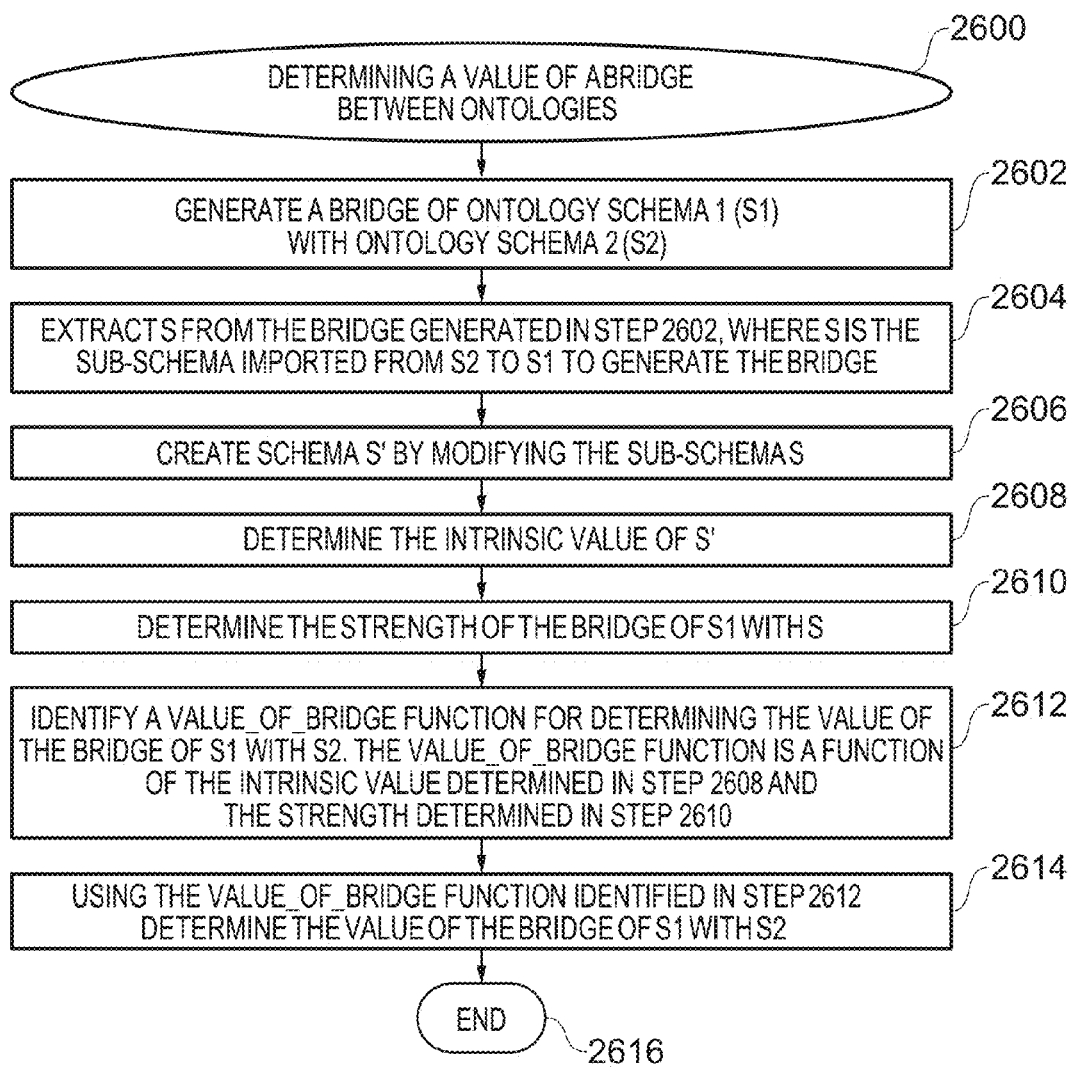
FIG. 26 is a flowchart of an example ontology merging process embodying the invention, which determines a value of a bridge between ontologies, where the process is implemented in the system of FIG. 24 and FIG. 25, in accordance with embodiments of the present invention.

FIG. 26 is a flowchart of an example ontology merging process embodying the invention, which determines a value of a bridge between ontologies, where the process is implemented in the system of FIG. 24 and FIG. 25, in accordance with embodiments of the present invention. The process in the flow chart of FIG. 26 determines a value of a bridge between ontologies, where the process is implemented in the system of FIG. 24 and FIG. 25. The process of determining a value of the bridge between ontologies starts at step 2600. In step 2602, association creation engine 2412 (see FIG. 24) generates a bridge of a first ontology schema (i.e., S1) with a second ontology schema (i.e., S2) by creating a bridge function: Bridge(S1,S2). S1 specifies a first ontology included in ontologies 2410-1 . . . 2410-N (see FIG. 24) and S2 specifies a second ontology included in ontologies 2410-1 . . . 2410-N (see FIG. 24).

The creation of Bridge(S1,S2) in step 2602 includes identifying concepts that S1 and S2 have in common, identifying significant concepts in S2, creating a sub-schema S of S2 based on the significant concepts, and importing S into S1. Creating Bridge(S1,S2) is described in more detail below in the discussion of FIG. 27. Bridge(S1,S2) created in step 2602 is also referred to herein simply as the bridge or the bridge of S1 with S2.

In step 2604, value determination engine 2414 (see FIG. 24) identifies sub-schema S by extracting S from the bridge, where S has been imported from S2 to S1 to create the bridge.

In step 2606, value determination engine 2414 (see FIG. 24) creates an independent, isolated schema S' by modifying the sub-schema S extracted in step 2604.

In step 2608, value determination engine 2414 (see FIG. 24) determines an intrinsic value of ontology schema S' created in step 2606. The intrinsic value determined in step 2608 measures the value of schema S' independently from the relationships S' has with ontology schema S1.

In step 2610, value determination engine 2414 (see FIG. 24) determines a strength of the bridge of ontology schema S1 with sub-schema S. In one embodiment, the strength determined in step 2610 measures the value of the liaison (i.e., association) between S1 and S. In one embodiment, value determination engine 2414 (see FIG. 24) evaluates a function Strength_of_bridge to determine the strength of the bridge of S1 with S. The Strength_of_bridge function depends on (1) the number of immediate links that every common concept has with other concepts of S; and (2) the distance that every common concept has with the central concepts of the first schema. The central concepts of a schema are the concepts in the schema that have the highest weight, where the weight of a concept is discussed in more detail below.

In step 2612, value determination engine 2414 (see FIG. 24) identifies or creates a function Value_of_Bridge that will be used to compute the value of the bridge of S1 with S2. The function Value_of_Bridge depends at least on (1) the intrinsic value of S' determined in step 2608 and (2) the strength of the bridge of S1 with S determined in step 2610.

In step 2614, value determination engine 2414 (see FIG. 24) uses the Value_of_Bridge function identified or created in step 2612 to determine the value of the bridge of ontology schema S1 with ontology schema S2.

The process of FIG. 26 ends at step 2616.

Figure 27:
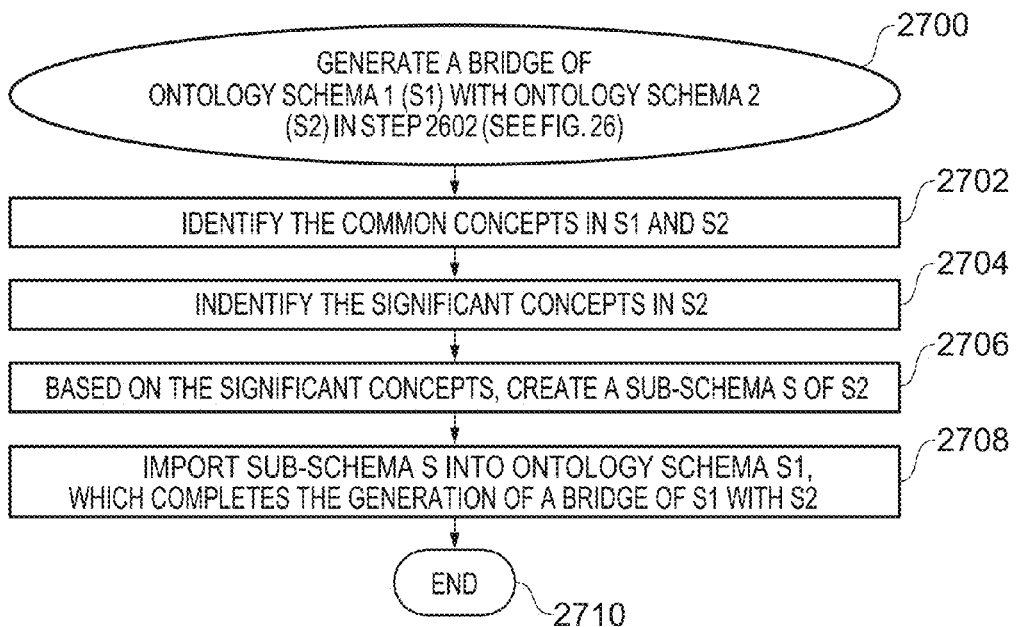
FIG. 27 is a flowchart of a process of generating a bridge of a first ontology schema with a second ontology schema, where the process is included in the process of FIG. 26, in accordance with embodiments of the present invention.

FIG. 27 is a flowchart of a process of generating a bridge of a first ontology schema with a second ontology schema, where the process is included in the process of FIG. 26, in accordance with embodiments of the present invention. The process in the flow chart of FIG. 27 generates a bridge of a first ontology schema with a second ontology schema, where the process is included in the process of FIG. 26. The process of FIG. 27 begins at step 2700. In one embodiment, the steps of FIG. 27 are included in step 2602 (see FIG. 26). In step 2702, value determination engine 2414 (see FIG. 24) identifies a set of common concepts {Cc} (i.e., concepts that ontology schema S1 and ontology schema S2 have in common and concepts in S1 and S2 that are similar). In one embodiment, value determination engine 2414 (see FIG. 24) utilizes similarity measures to identify the common concepts in step 2702. Those skilled in the art will recognize techniques that can be used to obtain the aforementioned similarity measures.

In step 2706, value determination engine 2414 (see FIG. 24) creates the sub-schema S (i.e., the sub-schema of ontology schema S2, which is to be imported into ontology schema S1) based on the set of significant concepts {Cs}. The sub-schema S is made of all significant concepts identified in step 2704 and all relationships the aforementioned significant concepts have among themselves in ontology schema S2.

In step 2708, value determination engine 2414 (see FIG. 24) imports the sub-schema S created in step 2706 into ontology schema S1.

After performing step 2708, the function Bridge(S1,S2) has been built if there exists any non-common concept in ontology schema S2 that is more significant that the significance threshold; otherwise, the function Bridge(S1,S2) has not been built. In the case in which the function Bridge(S1, S2) has not been built after performing step 2708, the bridge of S1 with S2 is considered to be not valuable.

The process of FIG. 27 ends at step 2710.

Figure 28:
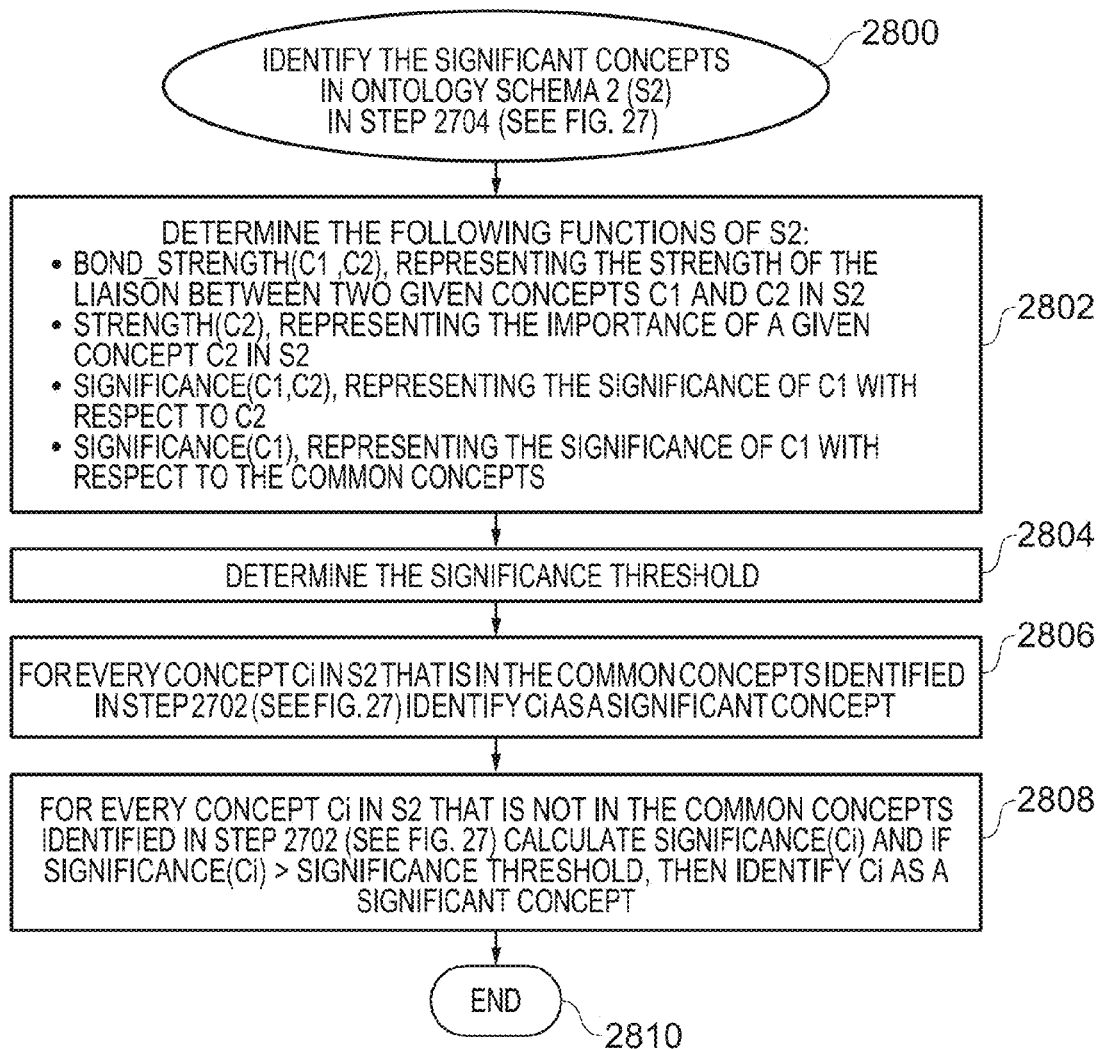
FIG. 28 is a flowchart of a process of identifying the significant concepts in the second ontology schema in the bridge generated in the process of FIG. 27, in accordance with embodiments of the present invention.

FIG. 28 is a flowchart of a process of identifying the significant concepts in the second ontology schema in the bridge generated in the process of FIG. 27, in accordance with embodiments of the present invention. The process in the flow chart of FIG. 28 identifies the significant concepts in a second ontology schema, where the process is included in the process of FIG. 27. The process of FIG. 28 begins at step 2800. In one embodiment, the steps of FIG. 28 are included in step 2704 (see FIG. 27). In step 2802, value determination engine 2414 (see FIG. 24) determines the following functions of ontology schema S2: bond_strength (C1,C2), representing the strength of the liaison between two given concepts C1 and C2 in ontology schema S2. Here one alternative to adapt the method of US 2014/0052759 A1 to implement the present invention is to set bond_strength (C1,C2) equal to information_value(C1,C2) to represent the value of information between two concepts C1 and C2 in S2. Another alternative way to implement the present invention is to set bond_strength(C1,C2) according the following formula:

$$\text{bond\_strength}(C1,C2)=\Sigma[1/(1+\text{information\_distance}(C1,C2))]$$

for each chain between C1 and C2, wherein strength(C2) represents the importance of a given concept C2 in ontology schema S2. Here, in order to adapt the method of US 2014/0052759 A1 to implement the present invention, a formula can be used for strength(C2) that provides the number of concepts for which the information_distance to C2 equals 0 (or is lower than a given threshold value). Insodoing, those concepts of S2 are identified that have a real information value to the common concepts, namely: significance(C1,C2) and significance(C1). It is noted that significance(C1,C2) represents the significance of C1 with respect to C2, where C1 and C2 are concepts in ontology schema S2. The significance(C1,C2) function is a function of bond_strength(C1,C2) and strength(C2). It is noted that significance(C1) represents the significance of C1 with respect to the common concepts identified in step 2702 (see FIG. 27). The significance(C1) function is a function of significance(C1,Ci), where Ci belongs to the set {Cc} identified in step 2702 (see FIG. 27).

The value determination engine 2414 (see FIG. 24) determines the aforementioned bond_strength(Ci,Cj) and strength(Ci) functions in step 2802. In another embodiment, an end user provides the bond_strength and strength functions by utilizing collaboration interface 248-1 (see FIG. 24) or another collaboration interface. The bond_strength and strength functions may also depend on one of the ontology schemas or depend on the structure of ontology schema S2.

In step 2804, value determination engine 2414 (see FIG. 24) determines a significance threshold. In one embodiment, value determination engine 114 (see FIG. 24) receives the significance threshold from an end user who provides the significance threshold via collaboration interface 2408-1 (see FIG. 24) or another collaboration interface. In another embodiment, value determination engine 2414 (see FIG. 24) may receive the significance threshold as a threshold value that depends on an ontology, such as the ontology provided by ontology schema S1, or that depends on the structure of S1.

In step 2806, for every concept Ci that is in ontology schema S2 and that is in the common concepts identified in step 2702 (see FIG. 27), value determination engine 2414 (see FIG. 24) identifies Ci as a significant concept and puts Ci into the set of significant concepts {Cs}.

In step 2808, for every concept Ci that is in ontology schema S2 and that is not in the common concepts identified in step 2702 (see FIG. 27), value determination engine 2414 (see FIG. 24) evaluates significance(Ci), by evaluating the significance(Ci) function determined in step 2802. Also in step 2808, value determination engine 2414 (see FIG. 24) determines whether significance(Ci) is greater than the significance threshold determined in step 2804. If significance (Ci)> significance threshold, then value determination engine 2414 (see FIG. 24) in step 2808 identifies Ci as a significant concept and puts Ci into the set {Cs}.

The process of FIG. 28 ends at step 2810.

By using the significance function and the significance threshold in the steps of FIG. 28, value determination engine 114 (see FIG. 24) allows the import of only the concepts that have some value in step 2708 (see FIG. 27). Moreover, the utilization of the significance threshold limits the number of imported concepts in a standardized manner (i.e., the same process and the same significance threshold), for all bridges being built with the process of FIG. 27, which includes the steps of FIG. 28. The standardized manner of limiting the number of imported concepts is required for making valid comparisons between different bridge values.

Figure 29:
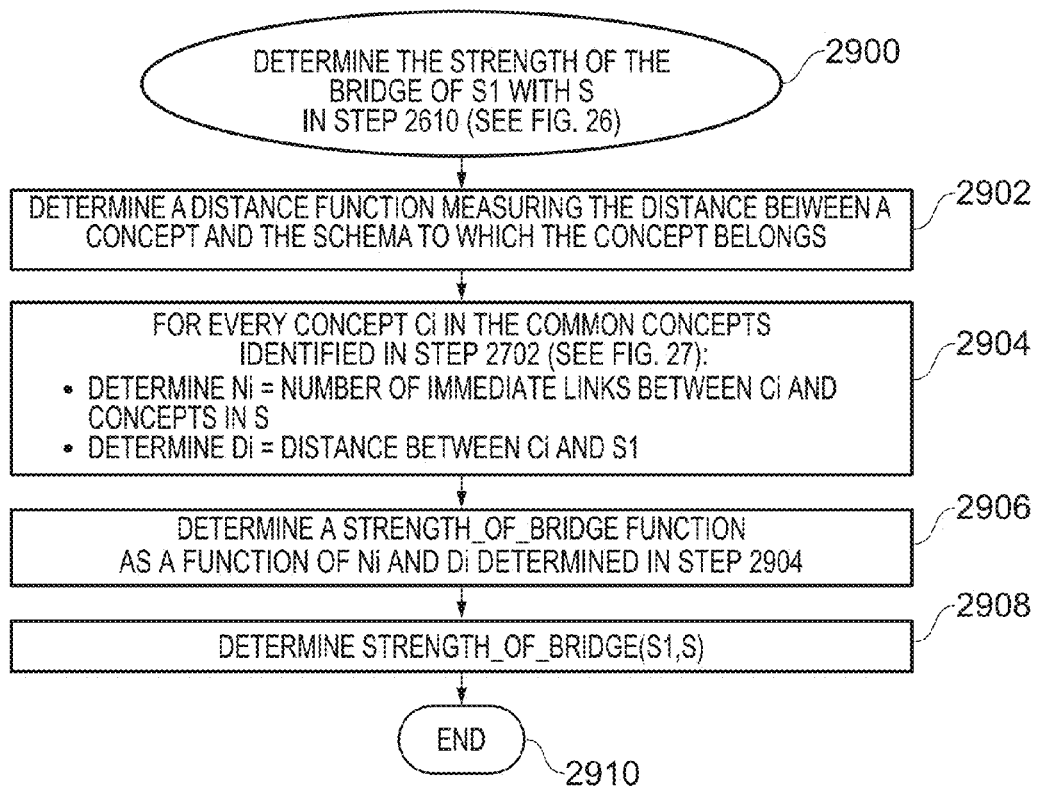
FIG. 29 is a flowchart of a process of determining the strength of the bridge of an ontology schema with a sub-schema extracted in the process of FIG. 26, in accordance with embodiments of the present invention.

FIG. 29 is a flowchart of a process of determining the strength of the bridge of an ontology schema with a sub-schema extracted in the process of FIG. 26, in accordance with embodiments of the present invention. The process of determining the strength is included in the process of FIG. 26. The steps of the process of FIG. 29 are included in step 2610 (see FIG. 26).

The process of FIG. 29 begins at step 2900.

In step 2902, value determination engine 2414 (see FIG. 24) determines the function Distance(C,S), which provides a measure of the distance between a concept C and the sub-schema S to which the concept belongs. Distance(C,S) is the shortest distance between concept C and any of the concepts which have the maximum weight in sub-schema S. In one embodiment, by default, value determination engine 2414 (see FIG. 24) automatically determines Distance(C,S) to be defined as follows:

$$\text{Distance}(C,S)=1+\text{MIN}[\text{information\_distance }(C,Ci)\ |\text{weight}(Ci)=\text{MAX}(\text{weight}(Cn))],$$

$$\text{weight}(Ci)=\text{Number\_of\_immediate\_links}(Ci)*\text{Number\_of\_direct\_concepts}(Ci)$$

where Number_of_immediate_links(Ci)=number of relationships Ci has with the other concepts, where the relationships are in chains of exactly one link, and where Number_of_direct_concepts(Ci)=number of concepts Cx in relation with Ci, through a chain of links that associates Ci and Cx, such that information_distance(Ci,Cx) on the considered chain is either zero or has the lowest possible non-zero value.

Insodoing, more strength is assigned to bridges when the common concepts have lower informational distance (i.e., more information link) to the importing schema S, and the strength of the bridge represents an information strength.

In step 2904, for every concept Ci in the concepts common to ontology schema S1 and sub-schema S, value determination engine 2414 (see FIG. 24) (1) determines Ni=the number of immediate links between concept Ci and concepts in sub-schema S extracted in step 2604 (see FIG. 26), and (2) determines Di=Distance(Ci,S1)=the distance between Ci and ontology schema S1.

In step 2906, value determination engine 2414 (see FIG. 24) determines a Strength_of_bridge function that depends on Ni and Di, which are determined in step 2904. In one embodiment, by default, value determination engine 2414 (see FIG. 24) in step 2906 automatically determines Strength_of_bridge(S1,S)=Σ[Number_of_immediate_links(Cx,S)/Distance(Cx,S1)] for each concept Cx in the set {Cc} identified in step 2702 (see FIG. 27), where Number_of_immediate_links(Cx,S)=number of relationships that Cx has with other concepts of S, where each relationship is in a chain having exactly one link, and where Distance(Cx,S1) measures the distance between Cx and ontology schema S1; i.e., measures how close or far Cx is from the central concepts of S1. It should be noted that the lowest possible value of Distance(C,S) is 1, thereby avoiding a division by zero in the evaluation of the Strength_of_bridge function.

In step 2908, value determination engine 2414 (see FIG. 24) determines the value of Strength_of_bridge(S1,S) by evaluating the Strength_of_bridge function determined in step 2906. The value determined in step 2908 is the strength of a bridge of ontology schema S1 with sub-schema S.

The process of FIG. 29 ends at step 2910.

In summary of the above detailed description, a method has been described for computing a value between two concepts in a schema containing a plurality of concepts which are linked to each other through associations. The method may be used for sorting searching engine results or for merging ontologies. In a schema S containing a plurality of 'n' concepts C1, C2 ... Ci ... Cn, the concepts are linked by associations, each association having a semantic distance set in a range lying between a minimum which indicates the two concepts are completely similar, i.e. equivalent, and a maximum which indicates the two concepts are completely dissimilar. An information value is determined between concepts from their semantic distance or informational distance. For completely or somewhat dissimilar concepts, the informational distance is computed according to their closeness using a first function that gives a lower informational distance with lower semantic distance between C1 and Ci, whereas, for completely or somewhat similar concepts, the informational distance is computed according to remoteness using a second function that gives a lower informational distance with higher semantic distance between C1 and Ci. Generally for all semantic distances away from the extrema, the first function will have an informational distance value lower than that of the second function. Moreover, the first function will have an informational distance that increases, e.g. monotonically, with semantic distance, whereas the second function will have an informational distance that decreases, e.g. monotonically, with semantic distance. In addition, when applied between two concepts C1 and Ci in a chain of concepts, both the first and second functions increase with the topological distance between C1 and Ci (i.e. with the number of links or concepts between C1 and Ci).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for computing a value between two concepts in a schema containing a plurality of concepts which are linked to each other through associations, said method comprising:

receiving, by one or more processors of a computer system, a result from a search engine resulting from a search query submitted to the search engine, said result comprising a schema S containing n concepts $C_1$, $C_2$ ... $C_i$ ... $C_n$ linked by associations, each such association forming a link in a chain connecting any two concepts of the n concepts, each such association having at least one semantic distance set in a range lying between a minimum semantic distance which indicates the two concepts are completely similar and a maximum semantic distance which indicates the two concepts are completely dissimilar, so that a semantic distance can be determined between said any two concepts of the n concepts by summing the at least one semantic distance between the two concepts, wherein the number of links in the chain that connects the concept $C_1$ with another concept of the n concepts is a topological distance;

computing, by the or more processors, an informational distance between the concept $C_1$ and the concept $C_{i+1}$ (i=1, 2, ..., n−1);

computing, by the one or more processors for i=1, 2, ..., n−1, an information value between the concept $C_1$ and the concept $C_{i+1}$, wherein the information value between the concept $C_1$ and the concept $C_{i+1}$ depends on the semantic distance between the concept $C_i$ and the concept $C_{i+1}$ and the informational distance between the concept $C_1$ and the concept $C_i$;

if the concept $C_i$ and the concept $C_{i+1}$ are separated by an association with a semantic distance above a threshold value, and are hence dissimilar concepts, then said one or more processors computing the informational distance between the concept $C_1$ and the concept $C_i$ according to a closeness using a first function that increases with topological distance between the concepts C1 and Ci and gives a lower informational distance with lower semantic distance between the concepts C1 and Ci;

if the concept Ci and the concept Ci+1 are not separated by the association with a semantic distance above the threshold value, and are hence similar concepts, then said one or more processors computing the informational distance between the concept C1 and the concept Ci according to a remoteness using a second function that increases with topological distance between the concepts C1 and Ci and gives a lower informational distance with higher semantic distance between the concepts C1 and Ci; and outputting, by the one or more processors, the information value between the concept C1 and the concept Ci+1.

2. The method of claim 1, wherein the information value between the concept C1 and the concept Ci+1 is proportional to the semantic distance between the concept Ci and the concept Ci+1.

3. The method of claim 2, wherein the information value between the concept C1 and the concept Ci+1 is inversely proportional to a sum of a constant and the informational distance between the concept C1 and the concept Ci.

4. The method of claim 1, wherein the schema S is provided with certain associations being fixed as indicating complete similarity between the concepts the certain associations interconnect, such that if such an association exists between a concept i and a concept i+1, then the information value between concept C1 and concept Ci+1 is set to be equal to the information value between concept C1 and concept Ci.

5. The method of claim 1, wherein the threshold value is set to 30, 40, 50, 60 or 70 percent of the maximum semantic distance to within plus/minus 5 percent.

6. The method of claim 1, wherein the first function has informational distance values less than or equal to those of the second function for all semantic distance values.

7. The method of claim 1, wherein the first function provides a value that increases monotonically with semantic distance.

8. The method of claim 1, wherein the second function provides a value that decreases monotonically with semantic distance.

9. The method of claim 1, wherein the information value is proportional to at least one value selected from the group consisting of an average of the semantic distances, an inverse of the semantic distances between the concepts in a sub-chain $Cx \ldots Ci+1$, and a combination thereof, wherein $1 \leq x \leq i+1$ and the length of the sub-chain $Cx \ldots Ci+1$ is a pre-determined constant.

10. A computer program product, comprising one or more computer readable hardware storage devices having computer readable program code stored therein, said program code containing instructions executable by one or more processors of a computer system to implement a method for computing a value between two concepts in a schema containing a plurality of concepts which are linked to each other through associations, said method comprising:

receiving, by the one or more processors, a result from a search engine resulting from a search query submitted to the search engine, said result comprising a schema S containing n concepts C1, C2 . . . Ci . . . Cn linked by associations, each such association forming a link in a chain connecting any two concepts of the n concepts, each such association having at least one semantic distance set in a range lying between a minimum semantic distance which indicates the two concepts are completely similar and a maximum semantic distance which indicates the two concepts are completely dissimilar, so that a semantic distance can be determined between said any two concepts of the n concepts by summing the at least one semantic distance between the two concepts, wherein the number of links in the chain that connects the concept C1 with another concept of the n concepts is a topological distance;

computing, by the or more processors, an informational distance between the concept C1 and the concept Ci+1 (i=1, 2, . . . , n−1);

computing, by the one or more processors for i=1, 2, . . . , n−1, an information value between the concept C1 and the concept Ci+1, wherein the information value between the concept C1 and the concept Ci+1 depends on the semantic distance between the concept Ci and the concept Ci+1 and the informational distance between the concept C1 and the concept Ci;

if the concept Ci and the concept Ci+1 are separated by an association with a semantic distance above a threshold value, and are hence dissimilar concepts, then said one or more processors computing the informational distance between the concept C1 and the concept Ci according to a closeness using a first function that increases with topological distance between the concepts C1 and Ci and gives a lower informational distance with lower semantic distance between the concepts C1 and Ci;

if the concept Ci and the concept Ci+1 are not separated by the association with a semantic distance above the threshold value, and are hence similar concepts, then said one or more processors computing the informational distance between the concept C1 and the concept Ci according to a remoteness using a second function that increases with topological distance between the concepts C1 and Ci and gives a lower informational distance with higher semantic distance between the concepts C1 and Ci; and outputting, by the one or more processors, the information value between the concept C1 and the concept Ci+1.

11. The computer program product of claim 10, wherein the information value between the concept C1 and the concept Ci+1 is proportional to the semantic distance between the concept Ci and the concept Ci+1.

12. The computer program product of claim 11, wherein the information value between the concept C1 and the concept Ci+1 is inversely proportional to a sum of a constant and the informational distance between the concept C1 and the concept Ci.

13. The computer program product of claim 10, wherein the schema S is provided with certain associations being fixed as indicating complete similarity between the concepts the certain associations interconnect, such that if such an association exists between a concept i and a concept i+1, then the information value between concept C1 and concept Ci+1 is set to be equal to the information value between concept C1 and concept Ci.

14. The computer program product of claim 10, wherein the threshold value is set to 30, 40, 50, 60 or 70 percent of the maximum semantic distance to within plus/minus 5 percent.

15. The computer program product of claim 10, wherein the first function has informational distance values less than or equal to those of the second function for all semantic distance values.

16. The computer program product of claim 10, wherein the first function provides a value that increases monotonically with semantic distance.

17. The computer program product of claim 10, wherein the second function provides a value that decreases monotonically with semantic distance.

18. The computer program product of claim 10, wherein the information value is proportional to at least one value selected from the group consisting of an average of the semantic distances, an inverse of the semantic distances between the concepts in a sub-chain $Cx \ldots Ci+1$, and a combination thereof, wherein $1 \leq x \leq i+1$ and the length of the sub-chain $Cx \ldots Ci+1$ is a pre-determined constant.

19. A computer system, comprising one or more processors, one or more memories, and one or more computer readable hardware storage devices, said one or more hardware storage device containing program code executable by the one or more processors via the one or more memories to implement a method for computing a value between two concepts in a schema containing a plurality of concepts which are linked to each other through associations, said method comprising:

receiving, by the one or more processors, a result from a search engine resulting from a search query submitted to the search engine, said result comprising a schema S containing n concepts $C1, C2 \ldots Ci \ldots Cn$ linked by associations, each such association forming a link in a chain connecting any two concepts of the n concepts, each such association having at least one semantic distance set in a range lying between a minimum semantic distance which indicates the two concepts are completely similar and a maximum semantic distance which indicates the two concepts are completely dissimilar, so that a semantic distance can be determined between said any two concepts of the n concepts by summing the at least one semantic distance between the two concepts, wherein the number of links in the chain that connects the concept C1 with another concept of the n concepts is a topological distance;

computing, by the or more processors, an informational distance between the concept C1 and the concept $Ci+1$ ($i=1, 2, \ldots, n-1$);

computing, by the one or more processors for $i=1, 2, \ldots, n-1$, an information value between the concept C1 and the concept $Ci+1$, wherein the information value between the concept C1 and the concept $Ci+1$ depends on the semantic distance between the concept Ci and the concept $Ci+1$ and the informational distance between the concept C1 and the concept Ci;

if the concept Ci and the concept $Ci+1$ are separated by an association with a semantic distance above a threshold value, and are hence dissimilar concepts, then said one or more processors computing the informational distance between the concept C1 and the concept Ci according to a closeness using a first function that increases with topological distance between the concepts C1 and Ci and gives a lower informational distance with lower semantic distance between the concepts C1 and Ci;

if the concept Ci and the concept $Ci+1$ are not separated by the association with a semantic distance above the threshold value, and are hence similar concepts, then said one or more processors computing the informational distance between the concept C1 and the concept Ci according to a remoteness using a second function that increases with topological distance between the concepts C1 and Ci and gives a lower informational distance with higher semantic distance between the concepts C1 and Ci; and outputting, by the one or more processors, the information value between the concept C1 and the concept $Ci+1$.

20. The computer system of claim 19, wherein the information value between the concept C1 and the concept $Ci+1$ is proportional to the semantic distance between the concept Ci and the concept $Ci+1$.

* * * * *